US009155077B2

(12) United States Patent
Song et al.

(10) Patent No.: US 9,155,077 B2
(45) Date of Patent: Oct. 6, 2015

(54) METHODS AND APPARATUS FOR ENABLING FURTHER ENHANCEMENTS TO FLEXIBLE SUBFRAMES IN LTE HETEROGENEOUS NETWORKS

(71) Applicant: BlackBerry Limited, Waterloo (CA)

(72) Inventors: Yi Song, Plano, TX (US); Chandra Sekhar Bontu, Nepean (CA); Zhijun Cai, Euless, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 195 days.

(21) Appl. No.: 13/842,550

(22) Filed: Mar. 15, 2013

(65) Prior Publication Data

US 2014/0092823 A1    Apr. 3, 2014

Related U.S. Application Data

(60) Provisional application No. 61/707,636, filed on Sep. 28, 2012.

(51) Int. Cl.
*H04J 3/00* (2006.01)
*H04W 72/04* (2009.01)
(Continued)

(52) U.S. Cl.
CPC .............. *H04W 72/0406* (2013.01); *H04L 1/00* (2013.01); *H04L 5/0044* (2013.01); *H04W 52/0206* (2013.01); *H04L 5/001* (2013.01); *H04L 5/0035* (2013.01); *H04L 5/1469* (2013.01); *H04W 72/04* (2013.01); *H04W 72/12* (2013.01); *H04W 84/045* (2013.01); *H04W 84/12* (2013.01); *H04W 88/08* (2013.01); *Y02B 60/50* (2013.01)

(58) Field of Classification Search
USPC ......... 370/280, 329, 342, 210, 294, 314, 321;
375/340, E1.025, 286, 231, 316
See application file for complete search history.

(56) References Cited

U.S. PATENT DOCUMENTS

2008/0096557 A1    4/2008    Rinne et al.
2010/0202331 A1    8/2010    Zhang et al.
(Continued)

OTHER PUBLICATIONS

3GPP TS 36.101 V11.1.0; 3rd Generation Partnership Project; Technical Specification Group Radio Access Network; Evolved Universal Terrestrial Radio Access (E-UTRA); User Equipment (UE) radio transmission and reception; Release 11; Jun. 2012; pp. 158-186.*

(Continued)

*Primary Examiner* — Phuongchau Ba Nguyen
(74) *Attorney, Agent, or Firm* — Conley Rose, P.C.; J. Robert Brown, Jr.

(57) ABSTRACT

A method is provided for communication in a wireless telecommunication network. The method comprises providing, by a network element, one of an uplink grant or a downlink grant to at least one UE that the network element has determined, based on information received from a plurality of UEs, is closer to the network element than is another UE, wherein the uplink grant is scheduled such that the UE transmits to the network element only during at least one flexible subframe, and wherein the downlink grant is scheduled such that the network element transmits to the UE only during at least one flexible subframe. The method further comprises transmitting, by the network element, to at least one UE that the network element has determined, based on information received from a plurality of UEs, is closer to the network element than is another UE, only during at least one flexible subframe.

25 Claims, 27 Drawing Sheets

(51) Int. Cl.
*H04L 1/00* (2006.01)
*H04W 52/02* (2009.01)
*H04W 88/08* (2009.01)
*H04W 72/12* (2009.01)
*H04W 84/04* (2009.01)
*H04W 84/12* (2009.01)
*H04L 5/00* (2006.01)
*H04L 5/14* (2006.01)

(56) References Cited

U.S. PATENT DOCUMENTS

| | | | |
|---|---|---|---|
| 2011/0208842 A1 | 8/2011 | Mildh et al. | |
| 2011/0249584 A1* | 10/2011 | Barbieri et al. | 370/252 |
| 2011/0268032 A1 | 11/2011 | Kim et al. | |
| 2011/0268045 A1 | 11/2011 | Heo et al. | |
| 2012/0082101 A1* | 4/2012 | Gaal et al. | 370/329 |
| 2012/0122503 A1 | 5/2012 | Ma et al. | |
| 2012/0184206 A1 | 7/2012 | Kim et al. | |

OTHER PUBLICATIONS

Song, Yi, et al.; U.S. Appl. No. 13/842,498, filed Mar. 15, 2013; Title: Methods and Apparatus for Enabling Further L1 Enhancements in LTE Heterogeneous Networks.

3GPP TS 36.101 V11.1.0; 3rd Generation Partnership Project; Technical Specification Group Radio Access Network; Evolved Universal Terrestrial Radio Access (E-UTRA); User Equipment (UE) Radio Transmission and Reception; Release 11; Jun. 2012; 336 pages.

3GPP TS 36.211 V11.2.0; 3rd Generation Partnership Project; Technical Specification Group Radio Access Network; Evolved Universal Terrestrial Radio Access (E-UTRA); Physical Channels and Modulation; Release 11; Feb. 2013; 109 pages.

3GPP TS 36.212 V11.2.0; 3rd Generation Partnership Project; Technical Specification Group Radio Access Network; Evolved Universal Terrestrial Radio Access (E-UTRA); Multiplexing and Channel Coding; Release 11; Feb. 2013; 82 pages.

3GPP TS 36.213 V11.2.0; 3rd Generation Partnership Project; Technical Specification Group Radio Access Network; Evolved Universal Terrestrial Radio Access (E-UTRA); Physical Layer Procedures; Release 11; Feb. 2013; 173 pages.

3GPP TS 36.300 V11.4.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; Release 11; Dec. 2012; 208 pages.

3GPP TS 36.331 V11.2.0; 3rd Generation Partnership Project; Technical Specification Group Radio Access Network; Evolved Universal Terrestrial Radio Access (E-UTRA); Radio Resource Control (RRC); Protocol Specification; Release 11; Dec. 2012; 340 pages.

3GPP TS 36.423 V11.3.0; 3rd Generation Partnership Project; Technical Specification Group Radio Access Network; Evolved Universal Terrestrial Radio Access Network (E-UTRAN); X2 Application Protocol (X2AP); Release 11; Dec. 2012; 141 pages.

3GPP TSG RAN WG1 Meeting #68bis; "Final Report of 3GPP TSG RAN WG1 #68 v1.0.0 (Dresden, Germany, Feb. 6-10, 2012"; R1-120951; Jeju, South Korea; Mar. 26-30, 2012; 94 pages.

3GPP TSG-RAN2 Meeting #77; "Inter-frequency Small Cell Identification"; R2-120654; Dresden, Germany; Feb. 6-10, 2012; 2 pages.

3GPP TSG-RAN WG2 #77bis; "Summary of Email Discussion [77#31] LTE: Hetnet Mobility: Inter-frequency Small Cell Detection"; R2-121487; Jeju, Korea; Mar. 26-30, 2012; 20 pages.

3GPP TSG-RAN Meeting #51; "New Study Item Proposal for Further Enhancements to LTE TDD for DL-UL Interference Management and Traffic Adaptation"; RP-110450; Kansas City, USA; Mar. 15-18, 2010; 7 pages.

3GPP TSG-RAN WG1 #69; "On Standardization Impact of TDD UL-DL Adaptation"; R1-122016; Prague, Czech Republic; May 21-25, 2012; 3 pages.

3GPP TSG-RAN WG1 #68bis; "Performance Analysis of DL-UL Interference Management and Traffic Adaptation in Multi-cell Pico-Pico Deployment Scenario"; R1-121529; Jeju, Korea; Mar. 26-30, 2012; 12 pages.

3GPP TSG RAN WG1 Meeting #69; "Evaluation for Multiple Outdoor Pico-cells Scenario with Macro Layer and Discussion of Interference Mitigation"; R1-122507; Prague, Czech Republic; May 21-25, 2012; 8 pages.

Chan, Peter, W. C., et al.; "The Evolution Path of 4G Networks: FDD or TDD?"; IEEE Communications Magazine; Dec. 2006; 9 pages.

PCT International Search Report; Application No. PCT/US2013/032586; May 31, 2013; 2 pages.

PCT Written Opinion of the International Searching Authority; Application No. PCT/US2013/032586; May 31, 2013; 7 pages.

PCT International Search Report; Application No. PCT/US2013/032590; May 31, 2013; 2 pages.

PCT Written Opinion of the International Searching Authority; Application No. PCT/US2013/032590; May 31, 2013; 8 pages.

Office Action dated Feb. 2, 2015; U.S. Appl. No. 13/842,550, filed Mar. 15, 2013; 25 pages.

\* cited by examiner

Modulation and TBS index table for PDSCH

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | reserved |
| 31 | 6 | reserved |

Figure 2a (prior art)

4-bit CQI Table

| CQI index | modulation | code rate x 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Figure 2b (prior art)

Modulation, TBS index and redundancy version table for PUSCH

| MCS Index $I_{MCS}$ | Modulation Order $Q'_m$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | reserved | | 2 |
| 31 | reserved | | 3 |

Modulation and TBS index table for PDSCH

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 8 | 26 |
| 30 | 8 | 27 |
| 31 | 8 | 28 |
| 32 | 8 | 29 |
| 33 | 8 | 30 |
| 34 | 8 | 31 |
| 35 | 8 | 32 |
| 36 | 8 | 33 |
| 37 | 2 | reserved |
| 38 | 4 | |
| 39 | 6 | |
| 40 | 8 | |

CQI Table

| CQI index | modulation | code rate x 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |
| 16 | 256QAM | 778 | 6.0781 |
| 17 | 256QAM | 832 | 6.5000 |
| 18 | 256QAM | 888 | 6.9375 |
| 19 | 256QAM | 942 | 7.3594 |

520

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 4 | 6 |
| 8 | 4 | 7 |
| 9 | 4 | 8 |
| 10 | 4 | 9 |
| 11 | 4 | 10 |
| 12 | 4 | 11 |
| 13 | 6 | 11 |
| 14 | 6 | 12 |
| 15 | 6 | 13 |
| 16 | 6 | 14 |
| 17 | 6 | 15 |
| 18 | 6 | 16 |
| 19 | 6 | 17 |
| 20 | 6 | 18 |
| 21 | 6 | 19 |
| 22 | 8 | 19 |
| 23 | 8 | 20 |
| 24 | 8 | 21 |
| 25 | 8 | 22 |
| 26 | 8 | 23 |
| 27 | 8 | 24 |
| 28 | 2 | reserved |
| 29 | 4 | reserved |
| 30 | 6 | reserved |
| 31 | 8 | reserved |

Figure 6a

| CQI index | modulation | code rate x 1024 | efficiency |
|---|---|---|---|
| 0 | out of range | | |
| 1 | QPSK | 78 | 0.1523 |
| 2 | QPSK | 246 | 0.4805 |
| 3 | QPSK | 416 | 0.8125 |
| 4 | QPSK | 602 | 1.1758 |
| 5 | 16QAM | 378 | 1.4766 |
| 6 | 16QAM | 490 | 1.9141 |
| 7 | 16QAM | 616 | 2.4063 |
| 8 | 64QAM | 466 | 2.7305 |
| 9 | 64QAM | 567 | 3.3223 |
| 10 | 64QAM | 666 | 3.9023 |
| 11 | 64QAM | 772 | 4.5234 |
| 12 | 64QAM | 873 | 5.1152 |
| 13 | 256QAM | 778 | 6.0781 |
| 14 | 256QAM | 856 | 6.6875 |
| 15 | 256QAM | 942 | 7.3594 |

| MCS Index $I_{MCS}$ | Modulation Order $Q_m$ | TBS Index $I_{TBS}$ |
|---|---|---|
| 0 | 4 | 9 |
| 1 | 4 | 10 |
| 2 | 4 | 11 |
| 3 | 4 | 12 |
| 4 | 4 | 13 |
| 5 | 4 | 14 |
| 6 | 4 | 15 |
| 7 | 6 | 15 |
| 8 | 6 | 16 |
| 9 | 6 | 17 |
| 10 | 6 | 18 |
| 11 | 6 | 19 |
| 12 | 6 | 20 |
| 13 | 6 | 21 |
| 14 | 6 | 22 |
| 15 | 6 | 23 |
| 16 | 6 | 24 |
| 17 | 6 | 25 |
| 18 | 6 | 26 |
| 19 | 8 | 26 |
| 20 | 8 | 27 |
| 21 | 8 | 28 |
| 22 | 8 | 29 |
| 23 | 8 | 30 |
| 24 | 8 | 31 |
| 25 | 8 | 32 |
| 26 | 8 | 33 |
| 27 | 8 | 34 |
| 28 | 8 | 35 |
| 29 | 4 | reserved |
| 30 | 6 | |
| 31 | 8 | |

Figure 7b

| CQI index | modulation | code rate x 1024 | efficiency |
|---|---|---|---|
| 0 | 16QAM | 378 | 1.4766 |
| 1 | 16QAM | 490 | 1.9141 |
| 2 | 16QAM | 616 | 2.4063 |
| 3 | 64QAM | 466 | 2.7305 |
| 4 | 64QAM | 567 | 3.3223 |
| 5 | 64QAM | 666 | 3.9023 |
| 6 | 64QAM | 772 | 4.5234 |
| 7 | 64QAM | 873 | 5.1152 |
| 8 | 64QAM | 948 | 5.5547 |
| 9 | 256QAM | 778 | 6.0781 |
| 10 | 256QAM | 802 | 6.2656 |
| 11 | 256QAM | 826 | 6.4531 |
| 12 | 256QAM | 852 | 6.6562 |
| 13 | 256QAM | 878 | 6.8594 |
| 14 | 256QAM | 904 | 7.0625 |
| 15 | 256QAM | 942 | 7.3594 |

| Transmission mode | DCI format | PUSCH transmission scheme |
|---|---|---|
| Mode 1 | Format 0 | SC-FDMA for single antenna port transmission, contiguous or non-contiguous resource allocation |
| Mode 2 | Format 4 | SC-FDMA for multiple antenna port transmission up to 4-layer spatial multiplexing, contiguous or non-contiguous resource allocation |
| Mode 3 | Format 5 | OFDMA for multiple antenna port transmission up to 4-layer spatial multiplexing |
| Mode 4 | Format 6 | OFDMA for single antenna port transmission |

Figure 8

- Carrier indicator – 0 or 3 bits. The field is present according to the definitions in [3].

- ~~Resource block assignment~~ — $\max\left(\left\lceil \log_2(N_{RB}^{UL}(N_{RB}^{UL}+1)/2) \right\rceil, \left\lceil \log_2\left(\left\lceil \frac{\left\lceil N_{RB}^{UL}/P+1 \right\rceil}{4} \right\rceil\right) \right\rceil\right)$ ~~bits, where~~

~~P is the UL RBG size as defined in section 8.1.2 of [3]~~

~~For resource allocation type 0:~~

~~The~~ $\left(\left\lceil \log_2(N_{RB}^{UL}(N_{RB}^{UL}+1)/2) \right\rceil\right)$ ~~LSBs provide the resource allocation in the UL subframe as defined in section 8.1.1 of [3]~~

~~For resource allocation type 1:~~

~~The~~ $\left\lceil \log_2\left(\left\lceil \frac{\left\lceil N_{RB}^{UL}/P+1 \right\rceil}{4} \right\rceil\right) \right\rceil$ ~~LSBs provide the resource allocation in the UL subframe as defined in section 8.1.2 of [3]~~

- <u>Resource allocation header (OFDMA resource allocation type 0 / type 1) – 1 bit as defined in section 7.1.6 of [3]</u>

<u>If uplink bandwidth is less than or equal to 10 PRBs, there is no resource allocation header and OFDMA resource allocation type 0 is assumed</u>

- <u>Resource block assignment</u>

- <u>For OFDMA resource allocation type 0 as defined in section 7.1.6.1 of [3]</u>

<u>$\left\lceil N_{RB}^{UL}/P \right\rceil$ bits provide the resource allocation</u>

- <u>For OFDMA resource allocation type 1 as defined in section 7.1.6.2 of [3]</u>

<u>$\left\lceil \log_2(P) \right\rceil$ bits of this field are used as a header specific to this resource allocation type to indicate the selected resource blocks subset</u>

<u>- 1 bit indicates a shift of the resource allocation span</u>

<u>$\left(\left\lceil N_{RB}^{UL}/P \right\rceil - \left\lceil \log_2(P) \right\rceil - 1\right)$ bits provide the resource allocation</u> where <u>P is the UL RBG size as defined in section 8.1.2 of [3]</u>

- TPC command for scheduled PUSCH – 2 bits as defined in section 5.1.1.1 of [3]
- Cyclic shift for DM RS and OCC index – 3 bits as defined in section 5.5.2.1.1 of [2]

Figure 9a

- UL index – 2 bits as defined in sections 5.1.1.1, 7.2.1, 8 and 8.4 of [3] (this field is present only for TDD operation with uplink-downlink configuration 0)

- Downlink Assignment Index (DAI) – 2 bits as defined in section 7.3 of [3] (this field is present only for TDD operation with uplink-downlink configurations 1-6)

- CSI request – 1 or 2 bits as defined in section 7.2.1 of [3]. The 2-bit field only applies to UEs that are configured with more than one DL cell.

- SRS request – 2 bits as defined in section 8.2 of [3]

- ~~Resource allocation type – 1 bit as defined in section 8.1 of [3]~~

In addition, for transport block 1:

- Modulation and coding scheme and redundancy version – 5 bits as defined in section 8.6 of [3]

- New data indicator – 1 bit

In addition, for transport block 2:

- Modulation and coding scheme and redundancy version – 5 bits as defined in section 8.6 of [3]

- New data indicator – 1 bit

Precoding information and number of layers: number of bits as specified in Table 5.3.3.1.8-1. Bit field as shown in Table 5.3.3.1.8-2 and Table 5.3.3.1.8- 3. Note that TPMI for 2 antenna ports indicates which codebook index is to be used in Table 5.3.3A.2-1 of [2], and TPMI for 4 antenna ports indicates which codebook index is to be used in Table 5.3.3A.2-2, Table 5.3.3A.2-3, Table 5.3.3A.2-4 and Table 5.3.3A.2-5 of [2]. If both transport blocks are enabled, transport block 1 is mapped to codeword 0; and transport block 2 is mapped to codeword 1. In case one of the transport blocks is disabled, the transport block to codeword mapping is specified according to Table 5.3.3.1.5-2. For a single enabled codeword, indices 24 to 39 in Table 5.3.3.1.8-3 are only supported for retransmission of the corresponding transport block if that transport block has previously been transmitted using two layers.

Figure 9b

CQI-ReportConfig information element

```
CQI-ReportConfig-r10 ::=    SEQUENCE {
    cqi-ReportAperiodic-r10         CQI-ReportAperiodic-r10     OPTIONAL,    -- Need ON
    nomPDSCH-RS-EPRE-Offset         INTEGER (-1..6),
    cqi-ReportPeriodic-r10          CQI-ReportPeriodic-r10      OPTIONAL,    -- Need ON
    pmi-RI-Report-r9                ENUMERATED {setup}          OPTIONAL,    -- Cond
PMIRIPCell
    csi-SubframePatternConfig-r10   CHOICE {
        release                         NULL,
        setup                           SEQUENCE {
            csi-MeasSubframeSet1-r10        MeasSubframePattern-r10,
            csi-MeasSubframeSet2-r10        MeasSubframePattern-r10
        }
    }                                                           OPTIONAL    -- Need ON
}
```

MeasSubframePattern information element

```
-- ASN1START

MeasSubframePattern-r10 ::= CHOICE {
    subframePatternFDD-r10          BIT STRING (SIZE (40)),
    subframePatternTDD-r10          CHOICE {
        subframeConfig1-5-r10           BIT STRING (SIZE (20)),
        subframeConfig0-r10             BIT STRING (SIZE (70)),
        subframeConfig6-r10             BIT STRING (SIZE (60)),
        ...
    },
    subframePattern                 BIT STRING (SIZE (10)),
    ...
}

-- ASN1STOP
```

Figure 13

CQI-ReportConfig information element

```
CQI-ReportConfig-r10 ::=    SEQUENCE {
    cqi-ReportAperiodic-r10         CQI-ReportAperiodic-r10      OPTIONAL,    -- Need ON
    nomPDSCH-RS-EPRE-Offset     INTEGER (-1..6),
    cqi-ReportPeriodic-r10          CQI-ReportPeriodic-r10       OPTIONAL,    -- Need ON
    pmi-RI-Report-r9                ENUMERATED {setup}           OPTIONAL,    -- Cond
PMIRIPCell
    csi-SubframePatternConfig-r10   CHOICE {
        release                     NULL,
        setup                       SEQUENCE {
            csi-MeasSubframeSet1-r10        MeasSubframePattern-r10,
            csi-MeasSubframeSet2-r10        MeasSubframePattern-r10
            csi-MeasSubframeSet3-r10        MeasSubframePattern-r10
        }
    }                                                            OPTIONAL     -- Need ON
}
```

Figure 14

RRCConnectionReconfiguration message

```
-- ASN1START

RRCConnectionReconfiguration ::=    SEQUENCE {
    rrc-TransactionIdentifier       RRC-TransactionIdentifier,
    criticalExtensions              CHOICE {
        c1                              CHOICE{
            rrcConnectionReconfiguration-r8    RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture        SEQUENCE {}
    }
}

RRCConnectionReconfiguration-r8-IEs ::= SEQUENCE {
    measConfig                      MeasConfig                          OPTIONAL,   -- Need ON
    mobilityControlInfo             MobilityControlInfo                 OPTIONAL,   -- Cond HO
    dedicatedInfoNASList            SEQUENCE (SIZE(1..maxDRB)) OF
                                        DedicatedInfoNAS                OPTIONAL,   -- Cond nonHO
    radioResourceConfigDedicated    RadioResourceConfigDedicated        OPTIONAL,   -- Cond HO-
toEUTRA
    securityConfigHO                SecurityConfigHO                    OPTIONAL,   -- Cond HO
    nonCriticalExtension            RRCConnectionReconfiguration-v890-IEs    OPTIONAL
}

RRCConnectionReconfiguration-v890-IEs ::= SEQUENCE {
    lateNonCriticalExtension        OCTET STRING                        OPTIONAL,   -- Need OP
    nonCriticalExtension            RRCConnectionReconfiguration-v920-IEs    OPTIONAL
}

RRCConnectionReconfiguration-v920-IEs ::= SEQUENCE {
    otherConfig-r9                  OtherConfig-r9                      OPTIONAL,   -- Need ON
    fullConfig-r9                   ENUMERATED {true}                   OPTIONAL,   -- Cond HO-
Reestab
    nonCriticalExtension            RRCConnectionReconfiguration-v1020-IEs   OPTIONAL
}

RRCConnectionReconfiguration-v1020-IEs ::= SEQUENCE {
    sCellToReleaseList-r10          SCellToReleaseList-r10              OPTIONAL,   -- Need ON
    sCellToAddModList-r10           SCellToAddModList-r10               OPTIONAL,   -- Need ON
    nonCriticalExtension            SEQUENCE {}                         OPTIONAL    -- Need OP
}

SCellToAddModList-r10 ::=       SEQUENCE (SIZE (1..maxSCell-r10)) OF SCellToAddMod-r10
```

Figure 17a

```
SCellToAddMod-r10 ::=            SEQUENCE {
    sCellIndex-r10                   SCellIndex-r10,
    cellIdentification-r10           SEQUENCE {
        physCellId-r10                   PhysCellId,
        dl-CarrierFreq-r10               ARFCN-ValueEUTRA
    }                                                                   OPTIONAL,    -- Cond SCellAdd
    radioResourceConfigCommonSCell-r10   RadioResourceConfigCommonSCell-r10  OPTIONAL,    --
Cond SCellAdd
    radioResourceConfigDedicatedSCell-r10  RadioResourceConfigDedicatedSCell-r10  OPTIONAL,  -
- Cond SCellAdd2
    carrierAggregationMode           ENUMERATED {SCellULControltoScell}   OPTIONAL,  -
- Cond SCellAdd
    ...
}

SCellToReleaseList-r10 ::=       SEQUENCE (SIZE (1..maxSCell-r10)) OF SCellIndex-r10

SecurityConfigHO ::=             SEQUENCE {
    handoverType                     CHOICE {
        intraLTE                         SEQUENCE {
            securityAlgorithmConfig          SecurityAlgorithmConfig    OPTIONAL,    -- Cond
fullConfig
            keyChangeIndicator               BOOLEAN,
            nextHopChainingCount             NextHopChainingCount
        },
        interRAT                         SEQUENCE {
            securityAlgorithmConfig          SecurityAlgorithmConfig,
            nas-SecurityParamToEUTRA         OCTET STRING (SIZE(6))
        }
    },
    ...
}

-- ASN1STOP
```

| *RRCConnectionReconfiguration* field descriptions |
|---|
| *carrierAggregationMode* |
| This field is used to indicate the inter-eNB carrier aggregation and hence the UE sends the UL control information ACK/NACK/CSI of SCell on SCell rather than on PCell. |

Figure 17b

```
RadioResourceConfigCommonSCell-r10 ::= SEQUENCE {
    -- DL configuration as well as configuration applicable for DL and UL
    nonUL-Configuration-r10                SEQUENCE {
        -- 1: Cell characteristics
        dl-Bandwidth-r10                   ENUMERATED {n6, n15, n25, n50, n75, n100},
        -- 2: Physical configuration, general
        antennaInfoCommon-r10              AntennaInfoCommon,
        mbsfn-SubframeConfigList-r10       MBSFN-SubframeConfigList  OPTIONAL, -
- Need OR
        -- 3: Physical configuration, control
        phich-Config-r10                   PHICH-Config,
        -- 4: Physical configuration, physical channels
        pdsch-ConfigCommon-r10             PDSCH-ConfigCommon,
        tdd-Config-r10                     TDD-Config               OPTIONAL -
- Cond TDDSCell
        tdd-Type                           ENUMERATED {dynamicFastAdaptation}
    OPTIONAL   -- Cond TDDSCell
    },
    -- UL configuration
    ul-Configuration-r10                   SEQUENCE {
        ul-FreqInfo-r10                    SEQUENCE {
            ul-CarrierFreq-r10             ARFCN-ValueEUTRA         OPTIONAL, -
- Need OP
            ul-Bandwidth-r10               ENUMERATED {n6, n15,
                                           n25, n50, n75, n100}    OPTIONAL, --
Need OP
            additionalSpectrumEmissionSCell-r10    AdditionalSpectrumEmission
        },
        p-Max-r10                          P-Max                    OPTIONAL, -- Need OP
        uplinkPowerControlCommonSCell-r10  UplinkPowerControlCommonSCell-
r10,
        -- A special version of IE UplinkPowerControlCommon may be introduced
        -- 3: Physical configuration, control
        soundingRS-UL-ConfigCommon-r10     SoundingRS-UL-ConfigCommon,
        ul-CyclicPrefixLength-r10          UL-CyclicPrefixLength,
        -- 4: Physical configuration, physical channels
        prach-ConfigSCell-r10              PRACH-ConfigSCell-r10    OPTIONAL, -
- Cond TDD-OR
        pusch-ConfigCommon-r10             PUSCH-ConfigCommon
    }                                                               OPTIONAL, -- Need OR
    ...
}
```

| *RadioResourceConfigCommon* field descriptions |
|---|
| tdd-Type |
| This field is used to indicate that dynamic TDD with fast adaptation is used on SCell. If only UL-DL configurations 0, 1, 2, 6 are allowed in SCell (i.e., configurations of 5ms DL-to-UL switch-point periodicity), the UE will assume Subframe 0 and 5 as static DL subframe, Subframe 1 and 6 as special subframe, Subframe 2 and 7 as static UL subframe, and the remaining subframes are flexible subframes. |

Figure 20

METHODS AND APPARATUS FOR ENABLING FURTHER ENHANCEMENTS TO FLEXIBLE SUBFRAMES IN LTE HETEROGENEOUS NETWORKS

FIELD OF THE DISCLOSURE

The present disclosure relates to communication in heterogeneous wireless telecommunications systems.

BACKGROUND

As used herein, the term "user equipment" (alternatively "UE") might in some cases refer to mobile devices such as mobile telephones, personal digital assistants, handheld or laptop computers, and similar devices that have telecommunications capabilities. Such a UE might include a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might include the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user. Also, the terms "user equipment," "UE," "user agent," "UA," "user device," and "mobile device" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an Evolved Universal Terrestrial Radio Access Network (E-UTRAN) node B (eNB), a wireless access point, or a similar component rather than a traditional base station. Any such component will be referred to herein as an eNB, but it should be understood that such a component is not necessarily an eNB. Such a component may also be referred to herein as an access node or a network element.

Any set of cells that includes one or more cells with a smaller coverage area than the typical coverage area of a traditional eNB may be referred to herein as a small cell deployment. A cell with the relatively large coverage area provided by a traditional eNB may be referred to herein as a macro cell. A cell with a relatively smaller coverage area than a macro cell may be referred to herein as a small cell, a pico cell, or a femto cell. Alternatively or additionally, a macro cell may be considered a high-power cell, and a small cell may be considered a low-power cell. The access node in a macro cell may be referred to as a macro eNB or a macro node, and the access node in a small cell may be referred to as a small cell eNB, a pico eNB, or a femto eNB. When reference is made herein to an action being taken by a cell, it should be understood that the action may be taken by a component in the cell, such as an eNB.

LTE may be said to correspond to Third Generation Partnership Project (3GPP) Release 8 (Rel-8), Release 9 (Rel-9), and Release 10 (Rel-10), and possibly also to releases beyond Release 10, while LTE Advanced (LTE-A) may be said to correspond to Release 10, Release 11 (Rel-11), and possibly also to releases beyond Release 10 and Release 11. As used herein, the terms "legacy", "legacy UE", and the like might refer to signals, UEs, and/or other entities that comply with LTE Release 11 and/or earlier releases but do not comply with releases later than Release 11. The terms "advanced", "advanced UE", and the like might refer to signals, UEs, and/or other entities that comply with LTE Release 12 and/or later releases. While the discussion herein deals with LTE systems, the concepts are equally applicable to other wireless systems as well.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 2a, 2b, and 2c are MCS index and CQI index tables according to the prior art.

FIGS. 5a and 5b are MCS index and CQI index tables, according to an embodiment of the disclosure.

FIGS. 6a and 6b are MCS index and CQI index tables, according to an alternative embodiment of the disclosure.

FIGS. 7a and 7b are MCS index and CQI index tables, according to another alternative embodiment of the disclosure.

FIG. 8 is a table of new transmission modes and DCI formats, according to an embodiment of the disclosure.

FIGS. 9a and 9b illustrate a new DCI format, according to an embodiment of the disclosure.

FIG. 13 illustrates a CQI-ReportConfig information element and a MeasSubframePattern information element, according to an embodiment of the disclosure.

FIG. 14 illustrates a CQI-ReportConfig information element, according to an embodiment of the disclosure.

FIGS. 17a and 17b illustrate an RRCConnectionReconfiguration message, according to an embodiment of the disclosure.

FIG. 20 illustrates RRC signaling to notify a UE about dynamic TDD in a pico cell, according to an embodiment of the disclosure.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. Embodiments are described herein in the context of an LTE wireless network or system, but can be adapted for other wireless networks or systems.

Embodiments of the present disclosure provide a number of techniques that may boost the traffic capacity in heterogeneous wireless telecommunication network deployments in which both larger cells and smaller cells are present.

Traffic capacity in future wireless systems may be improved by increasing the number of network nodes and thereby bringing the end-user devices physically closer to the network nodes. Network densification may be achieved by the deployments of complementary low-power nodes under the coverage of an existing macro-node layer. In such a heterogeneous deployment, the low-power nodes, such as pico and femto eNBs, may provide high end-user throughput for small areas, e.g., in indoor and hot-spot outdoor positions, while the macro layer may provide full-area coverage. Although such a heterogeneous deployment is already possible under the current LTE specifications, a low-power node deployment in a future system may be differentiated from current systems by at least two aspects.

First, a large number of low-power nodes in a future system may be expected to significantly increase the end-user data rates. The low-power nodes may be deployed in a cluster fashion to provide high data rates for a larger area. It may be expected that only a few UEs may be present in each low-power cell due to the low-power cell's small coverage area. The traffic dynamics in the low-power cell may be large, with a relatively low average load but high instantaneous data rates.

Figure 1:
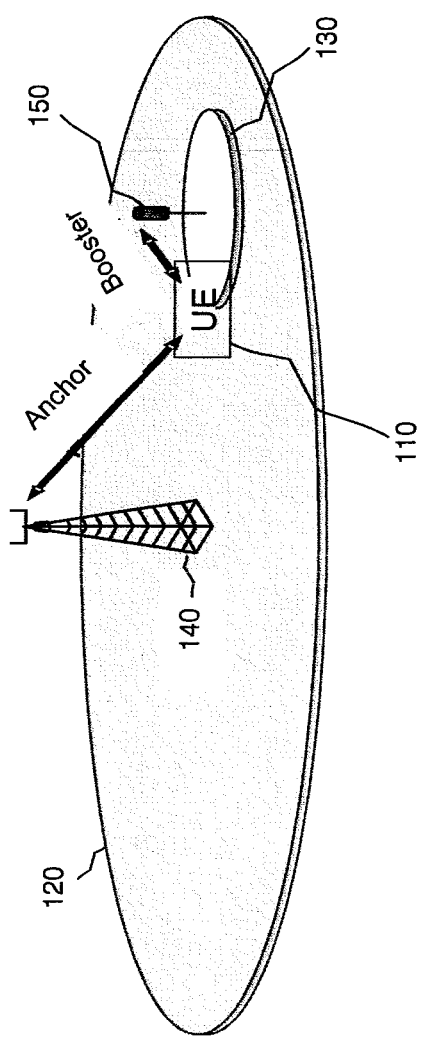
FIG. 1 is a diagram of a UE with dual connectivity to a macro cell and a pico cell, according to an embodiment of the disclosure.

Second, in a future system, such as that shown in FIG. 1, a UE 110 may be expected to have dual connectivity to both a macro cell 120 and a low-power cell 130. The macro cell 120 may be served by a macro eNB 140, and the low-power cell 130 may be served by a pico or femto eNB 150. While only one low-power cell 130 is shown in the figure, a plurality of low-power cells may be present within the coverage area of the macro cell 120.

The macro cell 120 and the low-power cell 130 may be on the same frequency or different frequencies. The macro cell 120 may act as an anchor to provide basic radio resource control (RRC) signaling, such as mobility-related signaling and possible low-rate/high-reliability data services, while the low-power cell 130 may provide high-rate data services for traffic boosting. The current LTE systems can provide dual cell connectivity via carrier aggregation in limited deployment scenarios, such as the macro cell 120 and the low-power cell 130 being on different frequencies and from the same eNB. In some cases, a future system may provide dual cell connectivity in additional deployment scenarios, such the macro cell 120 and the low-power cell 130 being on the same frequency or different frequencies as well as from the same eNB or different eNBs.

For downlink/uplink (DL/UL) transmission, the UE 110 may be informed of the modulation and coding scheme (MCS) of physical downlink shared channel/physical uplink shared channel (PDSCH/PUSCH) transmissions through the five-bit MCS index in a DL/UL grant. To help the eNB determine which MCS to use for DL transmission, the UE feeds back the four-bit channel quality index (CQI). The five-bit MCS index for the PDSCH/PUSCH and the four-bit CQI index are defined in 3GPP Technical Specification (TS) 36.213, as shown in FIGS. 2a, 2b, and 2c.

In LTE Rel-8, single carrier frequency division multiple access (SC-FDMA) with contiguous resource allocation was adopted for its low peak-to-average power ratio (PAPR) compared to orthogonal frequency division multiple access (OFDMA). SC-FDMA may also be referred to as discrete Fourier transform (DFT)-precoded orthogonal frequency division multiplexing (OFDM). In Rel-10, to improve the UL throughput while still maintaining a reasonably low PAPR, SC-FDMA with non-contiguous resource allocation (also referred to as clustered DFT-precoded OFDM) was introduced. With cluster DFT-precoded OFDM, a single DFT is applied to the input data stream and the DFT-precoded data are mapped to up to two non-contiguous resource block (RB) clusters. Compared to the Rel-8 SC-FDMA, the flexible resource allocation in clustered DFT-precoded OFDM improves the throughput performance. For a low-power cell in a future system, spectral efficiency may be of importance, and a low PAPR may not be a major concern due to the UE being close to the low-power cell eNB and not being power limited. Therefore, it is envisioned that a future UE may support OFDMA in the uplink in addition to SC-FDMA.

Figure 3:
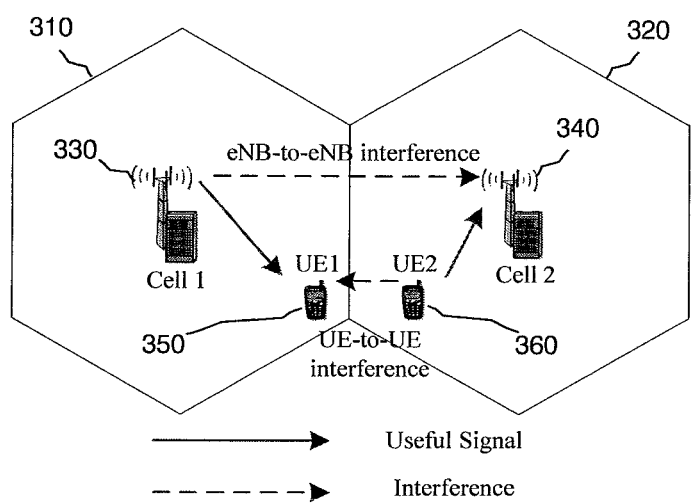
FIG. 3 is a diagram of eNB-to-eNB and UE-to-UE interference in dynamic TDD.

Time division duplexing (TDD) is expected to be used more often in pico cells. To better handle the high traffic dynamics in a local-area scenario where the number of UEs can be very small, dynamic TDD may be used. Each pico cell eNB may dynamically use subframes for either uplink or downlink to match the instantaneous traffic situation in the cell. This may lead to improvements in the end-user experience as well as the overall system throughput. However, if neighboring cells dynamically configure the UL/DL subframes independently, interference issues may arise, as illustrated in FIG. 3. In the figure, two neighboring cells 310 and 320 use different TDD UL/DL subframe configurations. If Cell 1 310 is in a DL subframe while Cell 2 320 is in a UL subframe, then eNB-to-eNB interference and/or UE-to-UE interference may occur.

In eNB-to-eNB interference, during Cell 2's uplink signal reception, the Cell 2 eNB 340 may see interference from the downlink transmission from Cell 1's eNB 330. This interference may degrade the UE UL throughput in Cell 2 320. Furthermore, this eNB-to-eNB interference may be significant due to the possible line-of-sight between the two eNBs 330 and 340.

In UE-to-UE interference, during UE1's downlink signal reception, UE1 350 may see interference from UE2's uplink transmission. This interference may degrade UE1's DL throughput. Furthermore, this interference may be significant if UE1 350 and UE2 360 are at cell edges with UE2 360 transmitting at a high power and UE1 350 seeing a weak signal from its eNB 330.

Carrier aggregation (CA) was introduced in Rel-10. With CA, component carriers (CCs) in Rel-10 are backward-compatible and can be fully accessible to Rel-8 UEs. Each CC appears as a separate cell with its own cell ID and transmits its own primary synchronization signal/secondary synchronization signal (PSS/SSS) and system information block (SIB) messages. Under CA, a UE can connect to one primary cell (PCell) and up to four secondary cells (SCells). The PCell is the cell that is initially configured during connection establishment. An SCell is a cell that may be configured after connection establishment, merely to provide additional radio resources. A single RRC connection may be established with the PCell, which controls all the CCs configured for a UE. After the RRC connection is established to the PCell, reconfiguration, addition, and removal of SCells may be performed by RRC. When adding a new SCell, dedicated RRC signaling may be used to send the system information (SI) of the new SCell to the UE. While in connected mode, changes of SI for an SCell may be handled by release and addition of the affected SCell, and this may be done with a single RRC reconfiguration message. To reduce PAPR and save UE power, the UL control signals, such as acknowledgements, negative acknowledgements, and channel state information (ACK/NACK/CSI), may be transmitted on the PCell. The UE may use the same cell-specific radio network temporary identifier (C-RNTI) in the PCell and the SCell.

In addition, cross-carrier scheduling may be supported in CA for interference coordination for the physical downlink control channel (PDCCH) in a heterogeneous network. One scheduler may be responsible for the scheduling of all aggregated carriers. The buffer status report (BSR) and scheduling request (SR) may reflect the overall buffered data for all carriers.

Embodiments of the present disclosure address at least four issues that may arise in the scenarios described above.

In a first set of embodiments, high order modulation, such as 256QAM (quadrature amplitude modulation), may be used in a pico cell to improve the spectral efficiency.

In a second set of embodiments, OFDMA may be used in a pico cell to improve the UL spectral efficiency.

A third set of embodiments is directed toward interference issues in a dynamic TDD system. Interference coordination has previously been discussed for dynamic TDD systems with slow adaptation, where the rate of TDD configuration change is greater than backhaul signaling delay, e.g., 200 milliseconds (ms). In such systems, the interference coordination may be based on information exchanged on the X2 interface between eNBs. The third set of embodiments provides interference coordination for a dynamic TDD network with fast adaptation, where the TDD configuration may change as fast as 10 ms. Furthermore, in a dynamic TDD network, the existing CSI feedback scheme may not be sufficient to provide the channel conditions due to the dynamic UL/DL subframes from the neighboring cells. The third set of embodiments may also provide improvement of CSI feedback for a dynamic TDD system.

In a future heterogeneous deployment, the macro layer may use frequency division duplexing (FDD) or TDD. The pico cell layer may be on a higher frequency using TDD for better traffic adaptation, or the pico cell may use FDD. A UE may have dual connectivity to both the macro cell and the pico cell. This is the multi-serving cell scenario, which may be implemented as carrier aggregation, with the PCell being the macro FDD/TDD and an SCell being the pico cell TDD/FDD. It is also possible for the PCell to be the pico cell and for the SCell to be the macro cell. The current CA in LTE assumes intra-eNB carrier aggregation and aggregated carriers having the same duplex mode, i.e., either FDD or TDD. The fourth set of embodiments provides methods to enable a UE to be served by multiple cells, which may be from different eNBs (inter-eNB carrier aggregation) and with different duplex modes.

Scenarios in which these embodiments may be deployed will now be considered. A low-power cell may be an independent cell with its own cell ID and may be on the same carrier frequency as the macro cell or a different carrier frequency from the macro cell. Due to the spectrum availability at higher frequencies, such as 3.5 gigahertz (GHz), and to aid in inter-layer interference avoidance, network operators may prefer to have the macro layer deployed at a lower frequency for large area coverage and have low-power cells deployed at a higher frequency for local area high data rate access.

The low-power cell may use new carrier type (NCT), in either a standalone or non-standalone manner. Standalone NCT may operate on its own and may transmit the full set of control signaling. Non-standalone NCT means that the carrier cannot be operated on its own and the low-power cell is to be associated with the standalone carrier of the macro cell. The UE may obtain information regarding the low-power cell non-standalone NCT through the standalone macro carrier and in turn may be able to access the low-power cell. Non-standalone NCT may save control signals. For example, SIB messages and a cell-specific reference signal (CRS) may not have to be transmitted, or only part of a CRS may have to be transmitted. However, the non-standalone NCT of the low-power cell may be expected to transmit control signals that allow the UE to identify the cell ID, perform frequency and time tracking, and measure the cell. The macro cell may also provide the UE certain information to help reduce the control signals from the non-standalone low-power cell. For example, instead of the low-power cell transmitting PSS/SSS, the macro cell may signal the UE a list of low-power cell IDs and the UE may pin down the low-power cell ID by checking the CRS sequences. In terms of better radio resource usage, non-standalone NCT may be preferred for low-power cells. The UE may enter the network only via the macro cell if non-standalone NCT is deployed on the low-power cell. Standalone NCT may or may not be backwards compatible. Backwards compatible NCT may be less efficient as it may carry some legacy signals for legacy UEs to access.

Figure 4A:
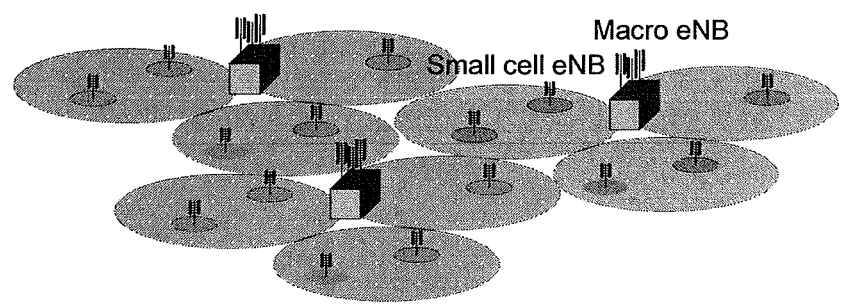
FIGS. 4a and 4b are deployment scenarios for low-power cells.
Figure 4B:
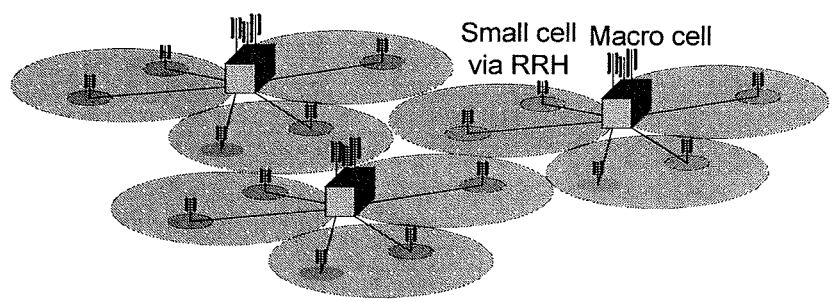

A low-power cell may be deployed as an independent eNB with its own backhaul, as shown in FIG. 4a. The communication between the macro cell and the low-power cell may involve the X2 interface with a backhaul delay. The low-power cell may also be deployed via a remote radio head (RRH) and may be connected to the macro cell via high-speed optical fiber, as shown in FIG. 4b. In the case of RRH, the low-power cell and the macro cell may belong to the same eNB and share the same backhaul. In such a case, the communication between the macro cell and the low-power cell may be achieved with negligible delay.

The UE may have dual connectivity to the macro cell and the low-power cell during RRC_CONNECTED mode. In such a scenario, there may be at least two use cases. In a first use case, it may be possible that the macro cell provides only basic RRC signaling, such as paging and mobility/handover (HO) related signaling, and that all the data services go through the low-power cell. In a second use case, the macro cell may provide basic RRC signaling as well as low-rate/high-reliability data services, and the low-power cell may provide high-rate data services. For example, if a user is engaged in both a voice over internet protocol (VoIP) call and file downloading, then the VoIP call may go through the macro cell and the file downloading may go through the low-power cell.

Depending on the deployment scenario, the UE may have separate RRC connections to the macro cell and to the pico cell or just one RRC connection to the macro cell. If the macro cell and the pico cell are from the same eNB (e.g., the pico cell is deployed as an RRH), then one RRC connection to the macro cell may be sufficient. If the macro cell and the pico cell are from different eNBs, then two RRC connections may be possible.

During RRC_IDLE mode, the UE may be expected to camp on the macro cell only. Although the UE may camp on the low-power cell in the case of a standalone carrier on the low-power cell, camping on the macro cell may simplify network operation.

The macro layer may use FDD or TDD while the low-power cell layer may be on a higher frequency using TDD for better traffic adaptation or may use FDD. The UE may have dual connectivity to both the macro cell and the pico cell. This multi-serving cell scenario may be implemented as carrier aggregation with the PCell using macro cell FDD or TDD and the SCell using low-power cell TDD or FDD. In such cases, the UE may remain connected to the macro cell, and the low-power cell may be added or removed via SCell addition or removal.

It may be assumed that the UE is CA-capable and that the UE may simultaneously communicate with the macro cell and one or more low-power cells. The macro layer and the low-power cell layer may be deployed with inter-band carrier aggregation, wherein the macro cell uses FDD and the low-power cell uses TDD, or both the macro cell and the low-power cell may use FDD but on different bands. In such cases, separate transceiver chains may be used. Alternatively, the macro cell and the low-power cell may use intra-band carrier aggregation, wherein both the macro cell and the low-power cell use FDD or TDD within the same band. In this case, for cost saving, the intra-band carrier aggregation may be implemented as a single radio frequency unit.

To save UE power, discontinuous reception (DRX) may be configured on a PCell due to the limited communication with the macro cell. Unlike the current CA, in which the same DRX configuration applies to all carriers, in the embodiments disclosed herein, different DRX configurations may be applied to a PCell and an SCell. The low-power cell may be informed of the subframes when the UE will communicate with the macro cell so that the data transmissions in the macro cell and the low-power cell may be coordinated to reliably maintain the two communication links under the UE maximum power constraint. The communication with the macro cell and the low-power cell may occupy different subframes so that the UE communicates with only one cell at any given time. Alternatively, the macro cell may determine the DRX configurations for both the macro cell and the pico cell.

Depending on how tightly the macro cell and the low-power cell operate, the macro cell and the low-power cell may be synchronous or asynchronous. If the macro cell and the low-power cell operate tightly, e.g., if the DRX configurations of the two cells are coordinated for UE power saving, then the transmissions from the two cells may be synchronized. That is, the subframe boundaries may be aligned. If the macro cell and the low-power cell operate independently, then the transmissions from the two cells may be asynchronous. Although the transmissions from the macro cell and the low-power cell may be synchronized, the signals arriving at the UE may not be perfectly aligned due to the different distances from the two cells to the UE.

As mentioned above, a first set of embodiments for increasing traffic capacity in a heterogeneous deployment of low-power nodes under the coverage of an existing macro-node layer involves supporting higher order modulation. In a pico cell in such a heterogeneous deployment, a UE may be in close proximity to the pico cell eNB, which may provide good channel conditions. To further improve the spectral efficiency at high signal-to-noise ratios (SNRs), higher order modulation may be used in the pico cell. That is, the highest order of modulation that can currently be used in a macro cell is 64QAM. Since the channel quality in a pico cell may be expected to be good, in an embodiment, a modulation order higher than 64QAM, such as 256QAM, may be used in a pico cell. Hereinafter, any modulation order higher than 64QAM may be referred to as 256QAM, but it should be understood that other higher modulation orders are possible. In general, any higher order modulation format that uses more than six bits of data and can be sent over one OFDM/SC-FDM subcarrier in a single input-single out channel may be enabled because of the better channel conditions expected in a low-power cell environment.

In an embodiment, to enable 256QAM, the existing MCS tables for PDSCH/PUSCH and the existing CQI table, shown in FIGS. 2a, 2b, and 2c, may be modified. There may be at least three options for modifying the MCS and CQI tables. The three options may be discussed from the perspective of a pico cell transmitting to a UE, but similar considerations may apply to transmissions made by a UE.

A first option is to expand the MCS and CQI index tables to include 256QAM. For example, the MCS index table for the PDSCH and the CQI index table may be expanded as shown in FIGS. 5a and 5b. In these examples, the modifications relative to the prior tables are illustrated by shading. In FIG. 5a, the field modulation and coding scheme in the DL/UL grant is increased from five bits to six bits. That is, if only five bits are used for the values in column 510, then only 32 values are possible. With six bits, the expansion of the MCS table is possible. Similarly, in FIG. 5b, the CQI feedback is increased from four bits to five bits. That is, if only four bits are used for the values in column 520, then only 16 values are possible. With five bits, the expansion of the CQI table is possible. The existing transport block size (TBS) tables for the PDSCH and the PUSCH in 3GPP TS 36.213 may also be modified to include the large transport block sizes for 256QAM. An advanced UE capable of 256QAM may assume one additional bit in the DL/UL grant decoding and one additional bit in the CQI feedback, as well as using the new MCS/CQI/TBS tables. The eNB may need to learn the UE's capabilities so that the eNB can transmit the DL/UL grant in the appropriate format and assume one additional bit in CQI decoding. In an embodiment, the UE may indicate its relevant capability, i.e., whether 256QAM is supported, to the eNB via RRC signaling. In another embodiment, certain UE categories may implicitly include such a capability, so when the UE indicates its category, its capability to support 256QAM is also indicated.

A second option is to redesign the MCS and CQI index tables and retain five bits for the MCS indication and four bits for CQI feedback. In an embodiment, to cover a wider range of SNR and keep the same number of MCS/CQI bits, the redesigned MCS/CQI index tables may have a less fine granularity of MCS/CQI. One such example is shown in FIGS. 6a and 6b. It can be seen in FIG. 6a that only eight MCS indices use a modulation order of 2, only seven MCS indices use a modulation order of 4, and only ten MCS indices use a modulation order of 6. This may be contrasted with FIG. 2a, where eleven MCS indices use a modulation order of 2, eight MCS indices use a modulation order of 4, and thirteen MCS indices use a modulation order of 6. It can also be seen that a modulation order of 8, which is not present in FIG. 2a, has been added to FIG. 6a.

The existing TBS tables in 3GPP TS 36.213 may also be modified to include the large transport sizes for 256QAM. In such cases, an advanced UE capable of 256QAM may use the redesigned MCS/CQI/TBS tables. The eNB may need to learn the UE's capabilities to determine whether the UE can use the redesigned MCS/CQI tables for DL/UL grants and CQI interpretation. In an embodiment, as with the first option, the UE may indicate its relevant capability, i.e., whether 256QAM is supported, to the eNB via dedicated RRC signaling. In another embodiment, certain UE categories may implicitly include such a capability, so when the UE indicates its category, its capability to support 256QAM is also indicated. In either the first option or the second option, the eNB may additionally or alternatively query the UE's capabilities.

A third option is to design an additional set of MCS/CQI index tables to cover the high SNR region. An example of this option is shown in FIGS. 7a and 7b. In this example, the UE may use the existing MCS/CQI tables for the low to medium SNR region and may use the new MCS/CQI tables for the medium to high SNR region. RRC signaling may be used to indicate to the UE which set of tables to use for MCS determination and CQI feedback. In this option, the two sets of MCS/CQI tables may overlap (i.e., have some common entries) to ensure a smooth transition between the two configurations. For example, the last nine entries of the CQI table in FIG. 2b and the first nine entries of the CQI table in FIG. 7b are the same. Again, the eNB may need to learn the UE's capabilities to use additional MCS/CQI tables for DL/UL grants and CQI interpretation. The TBS tables in 3GPP TS 36.213 may also be modified to include the large transport sizes for 256QAM.

As mentioned above, a second set of embodiments for increasing traffic capacity in a heterogeneous deployment of low-power nodes under the coverage of an existing macronode layer involves supporting OFDMA on the UL. In an embodiment, to support OFDMA on the UL, additional PDCCH downlink control information (DCI) formats for UL grants may be introduced.

In LTE Rel-10, two transmission modes were defined for the PUSCH. Transmission Mode 1 is for single antenna port transmission, whereas Transmission Mode 2 is for multiple antenna port transmission. PDCCH DCI format 0 is used to indicate Transmission Mode 1, whereas DCI format 4 is used to indicate Transmission Mode 2. In this second set of embodiments, to support UL OFDMA transmission, new transmission modes, which may be referred to as Mode 3 and Mode 4, and new DCI formats, which may be referred to as Format 5 and Format 6, may be introduced, as shown in FIG. 8. Shading in the figure indicates the newly introduced transmission modes and DCI formats. In this embodiment, Transmission Mode 3 and DCI Format 5 are for UEs with multiple antenna ports, whereas Transmission Mode 4 and DCI Format 6 are for UEs with a single antenna port. In some embodiments, such as when a UE is envisioned to always be equipped with multiple antennas, Transmission Mode 4 and DCI Format 6 may not be included. To reduce UE complexity, the PUSCH may support up to four-layer spatial multiplexing. In some embodiments, RRC signaling may be used to inform the UE about the transmission mode.

In an embodiment, there may be at least two options for the reference signals for UL OFDMA transmission. In a first option, the UE may reuse the Rel-10 UL demodulation reference signal (DMRS) which is transmitted in the middle OFDM symbol of the slot (i.e., the fourth OFDM symbol of the slot for a normal cyclic prefix (CP) and the third OFDM symbol for an extended CP) with a Zadoff-Chu sequence in the frequency domain and a possible orthogonal cover code (OCC) in the time domain. To maintain orthogonality among the DMRSs from multiple transmission layers, CDM (code division multiplexing) may be used, and the DMRSs of different transmission layers may use different cyclic shifts of the same Zadoff-Chu base sequence. The same precoder for PUSCH transmission may be applied on the DMRS. For an OFDMA transmission with non-contiguous resource allocation, similarly to the Rel-1 SC-FDMA with non-contiguous resource allocation, one Zadoff-Chu sequence may be generated with a length equal to the total number of subcarriers of the non-contiguous resource blocks.

In a second option, the UE may reuse the DL UE-specific reference signal (RS) of antenna ports 7-10. The RS for the first and second transmission layers and the RS for third and fourth layers may be multiplexed by frequency division multiplexing (FDM). The RS for the first and second layers (or the third and fourth layers) may be multiplexed by means of CDM by using OCC over two consecutive resource elements in the time domain. The same precoder for PUSCH transmission may be applied on the RS. To multiplex multiple UEs on the same UL resource blocks, different UEs may transmit on different antenna ports with orthogonal RS sequences, or different UEs may transmit on the same antenna ports with quasi-orthogonal RS sequences generated by a different scrambling seed. The second option may potentially provide better channel estimation than the first option due to the RS being more distributed in the RB.

In some embodiments, the new DCI Formats 5 and 6 may be based on DCI Formats 4 and 0, respectively, by replacing the resource allocation field with the OFDMA resource allocation from DL grants. An example of DCI Format 5 is shown in FIGS. 9a and 9b, where the modifications compared to Format 4 are underlined. The references appearing in FIGS. 9a and 9b refer to items in 3GPP TS 36.212. DCI Formats 5 and 6 can allocate more than two non-contiguous resource block (RB) clusters.

Figure 10:
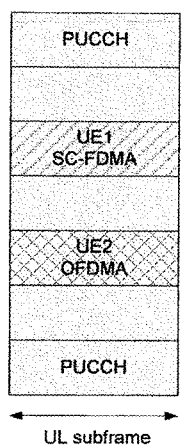
FIG. 10 is a diagram of SC-FDMA and OFDMA multiplexed in one uplink subframe, according to an embodiment of the disclosure.

In the various embodiments under this second set of embodiments, the following considerations may apply. The existing DL OFDMA resource allocation type 2 may also be supported to allocate a set of contiguously allocated localized or distributed virtual resource blocks (VRBs) for UL OFDMA. In some embodiments, the Rel-10 precoding codebook for SC-FDMA may be reused for UL OFDMA. A new codebook for UL OFDMA may also be designed. Due to the likely line-of-sight propagation environment in a pico cell, multi-layer transmission may not be efficient, and single-layer transmission with multiple antenna ports may be preferred. In some embodiments, to reduce the payload size of the DCI, DCI Format 5 may be further simplified by, e.g., specifying only one transport block and one transmission layer so that the number of bits in the field Precoding information and number of layers in DCI may be reduced. As the channel is relatively flat in the frequency domain in pico cells and the UE connected to the pico cell may be a high data rate user, to reduce the signal overhead, a large resource block group (RBG) size may be used to reduce the number of bits in the field Resource block assignment in DCI. OFDMA Transmission Mode 3 (OFDMA for multiple antenna port transmission) may fall back to either OFDMA Mode 4 (OFDMA for single antenna port transmission) if supported or SC-FDMA Mode 1 (SC-FDMA for single antenna port transmission). In an embodiment, OFDMA and SC-FDMA may be multiplexed in one UL subframe, as shown in the embodiment of FIG. 10. Instead of Transmission Mode 3 and 4 for OFDMA only, Transmission Mode 3 and 4 may also be designed to cover both SC-FDMA and OFDMA, with one bit in the DCI format to indicate whether SC-FDMA or OFDMA will be used. Such an embodiment may allow the UE to dynamically switch between SC-FDMA and OFDMA. Due to the small propagation delay spread in pico cells, smaller CP lengths may be introduced in LTE, for example for a better spectral efficiency. Due to the spectrum availability at high frequencies, to further enhance the data rate in pico cells, a channel bandwidth greater than 20 megahertz (MHz) may be introduced in LTE.

A third set of embodiments is directed toward interference coordination in a dynamic TDD network with fast adaptation, where the TDD configuration may change as fast as 10 ms. That is, with existing methods for providing TDD reconfiguration information, such as sending the reconfiguration information in a SIB message, adaptation may occur at a rate on the order of 640 ms. In some proposed methods, adaptation may occur at a much faster rate. A change in TDD configuration that occurs much slower than the backhaul signaling delay, for example slower than every 200 ms, may be referred to herein as slow adaptation, and a change in TDD configuration that occurs faster than the backhaul signaling delay may be referred to herein to as fast adaptation.

Figure 11:
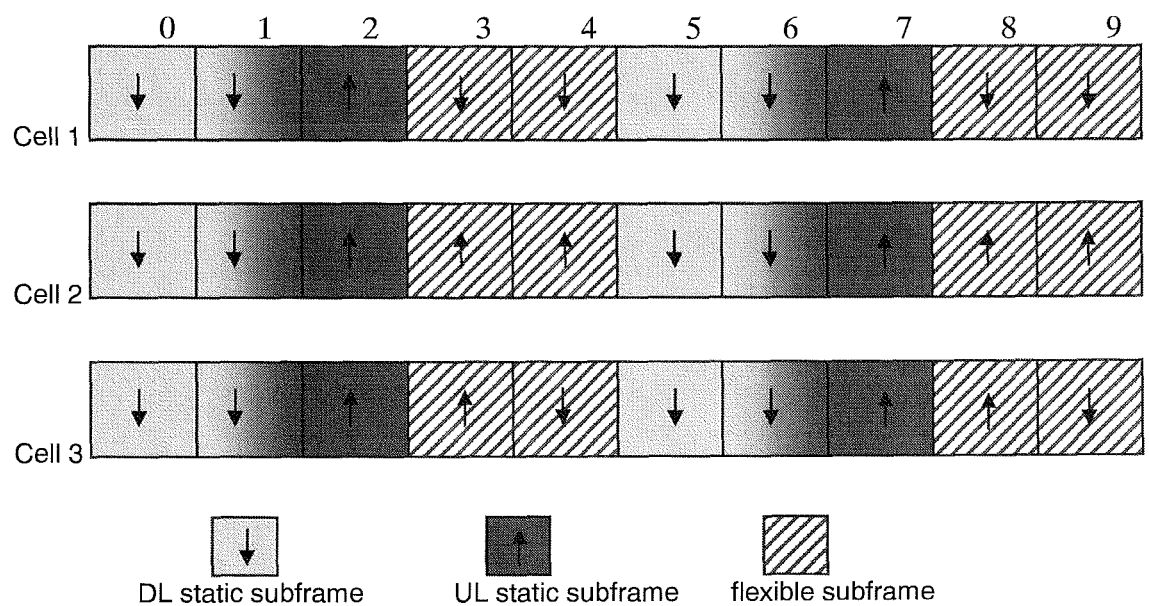
FIG. 11 is a diagram of dynamic TDD in neighboring cells, according to an embodiment of the disclosure.

In these embodiments, pico cells may schedule cell-center UEs only during flexible subframes to avoid interference. That is, in one radio frame, some subframes may be static uplink or static downlink, and other subframes may have the flexibility to be either uplink or downlink for traffic adaptation. For example, if only UL/DL configurations 0, 1, 2, and 6 are allowed to be used in a pico cell (i.e., configurations of 5 ms DL-to-UL switch-point periodicity), as shown in the example of FIG. 11, the UE may assume that Subframes 0, 1, 5, and 6 are static DL subframes including special subframes, that Subframes 2 and 7 are static UL subframes, and that the remaining subframes are flexible subframes. Therefore, during static uplink subframes, all neighboring cells are on the uplink, and during static downlink subframes, all neighboring cells are on the downlink. During the flexible subframes, some cells may be on the uplink and some cells may be on the downlink. eNB-to-eNB interference and UE-to-UE interference may occur during the flexible subframes. In this third set of embodiments, cell-center UEs may be scheduled only during these flexible subframes. To improve the CSI feedback, the third set of embodiments may also involve having the UE feed back multiple CQIs for multiple sets of subframes to reflect the different interference levels in different subframes.

In the case of TDD configurations dynamically changing as fast as 10 ms, the existing X2-based interference coordination scheme may not work due to the delay of X2 messages. That is, the TDD configurations of neighboring cells may not be known, as the X2-based signaling may not be fast enough to update the neighboring cell information. In this case, conservative approaches to mitigate interference may be taken.

As mentioned above, in dynamic TDD, some subframes in a radio frame may be flexible to be either uplink or downlink for traffic adaptation while others are static uplink or static downlink. During consecutive flexible subframes, to avoid an additional guard period at the UE, it may be preferable for DL-to-UL subframe switching not to happen. It may be assumed that the radio frame boundaries of neighboring cells are aligned. The UE may be signaled about the configuration of static UL/DL and flexible subframes, or this information may be pre-configured. Each cell may receive information to determine flexible subframes and static subframes in a radio frame, e.g., from operations, administration and maintenance (OAM). The cell may be restricted to choose TDD configurations from a set of UL/DL configurations, e.g., TDD UL/DL configurations 0, 1, 2, and 6 in current LTE, which are the configurations with 5 ms DL-to-UL switch point periodicity.

In an embodiment, during the flexible subframes, the cell in a DL subframe may reduce the transmit power by scheduling cell-center UEs to reduce the interference to a neighboring eNB which is in a UL subframe. Furthermore, during the flexible subframes, the cell in a UL subframe may schedule cell-center UEs so that the UEs will transmit at low power and their UL transmissions will not create interference to the UE's DL reception in a neighboring cell which is in a DL subframe. Such an approach virtually shrinks cell sizes in the flexible subframes to avoid interference.

That is, an eNB may receive signal strength reports, measurement reports, power headroom reports, or other information from a plurality of UEs and may use such information to infer the relative distances or signal attenuation factor of the UEs from the eNB. UEs that are determined to be relatively closer to the eNB or have smaller signal attenuation factors than other UEs may be referred to as cell-center UEs, and UEs that are determined to be relatively farther from the eNB or have larger signal attenuation factors than other UEs may be referred to as cell-edge UEs. It should be understood that the terms "cell-center" and cell-edge" are relative terms and that a UE referred to as a cell-center UE is not necessarily directly in the center of a cell and that a UE referred to as a cell-edge UE is not necessarily directly at the edge of a cell. In an embodiment, the eNB uses the flexible subframes for cell-center UEs and the fixed subframes for the cell-edge as well as cell-center UEs.

Figure 12:
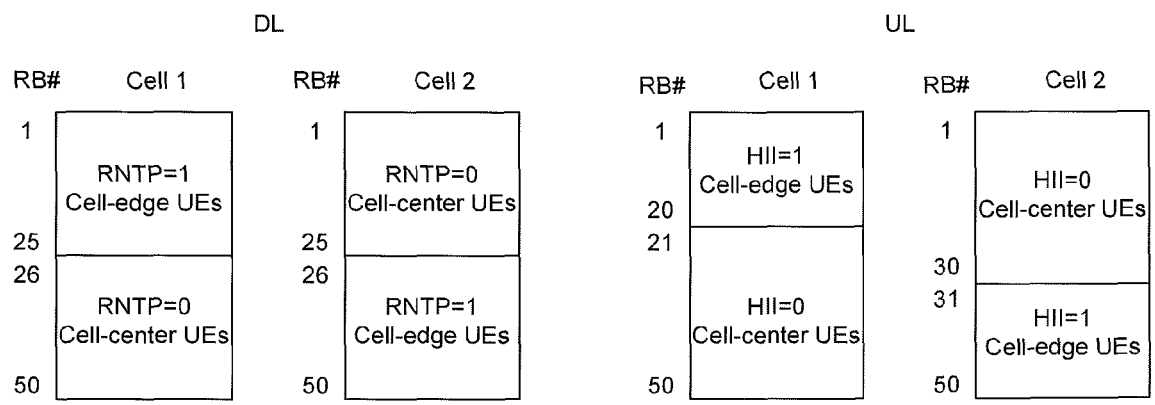
FIG. 12 is a diagram of interference coordination for dynamic TDD, according to an embodiment of the disclosure.

Alternatively, in some embodiments, the DL transmissions in a cell scheduled in the flexible and static DL subframes obey the cell's relative narrowband transmit power (RNTP), and the UL transmissions scheduled in the flexible and static UL subframes obey the cell's high interference indicator (HII). The RNTP and HII may be exchanged on X2 to inform neighboring cells. In the case of dynamic TDD with fast adaptation, as a cell may not know the TDD configurations of neighboring cells, the cell may take account of both the RNTP and the HII of a neighboring cell and attempt to schedule the transmissions such that the interference to the neighboring cell is minimized no matter whether the neighboring cell is on a UL subframe or a DL subframe. For example, let Cell 1 and Cell 2 be two neighboring cells with RNTP and HII values as shown in the example of FIG. 12. On the DL, Cell 1 assigns RBs 1-25 with RNTP=1 for high-power transmission to cell-edge UEs and assigns RBs 26-50 with RNTP=0 for low-power transmission to cell-center UEs. For inter-cell interference coordination, Cell 2 schedules its cell-edge UEs on RBs 26-50. Similarly on the UL, Cell 1 assigns RBs 1-20 with HII=1 for cell-edge UE transmissions and assigns RBs 21-50 with HII=0 for cell-center UE transmissions. For inter-cell interference coordination, Cell 2 schedules its cell-edge UE UL transmissions on RBs 31-50.

In one example, Cell 1 is in a DL flexible subframe. If Cell 2 is also in a DL flexible subframe, then Cell 1 may schedule its cell-edge UEs on RBs 1-25 and its cell-center UEs on RBs 26-50. If Cell 2 is in a UL flexible subframe, Cell 1 may still schedule its high-power cell-edge UEs on RBs 1-25, as Cell 2 may schedule its cell-center UEs on the UL which are less sensitive to eNB-to-eNB interference. Meanwhile, Cell 1 may schedule its cell-center UEs on RBs 26-50, as the cell-center UEs are less sensitive to UE-to-UE interference even if Cell 2 schedules its cell-edge UEs on the UL on RBs 31 to 50. Combining the above analysis, as a result, if Cell 1, which is in a DL flexible subframe, does not know whether Cell 2 is in a UL subframe or a DL subframe, it is safe for Cell 1 to schedule its cell-edge UEs on RBs 1-25 and its cell-center UEs on RBs 26-50.

In another example, Cell 1 is in a UL flexible subframe. If Cell 2 is also in a UL flexible subframe, then Cell 1 may schedule its cell-edge UEs on RBs 1-20 and its cell-center UEs on RBs 21-50. If Cell 2 is in a DL flexible subframe, Cell 1 may still schedule its high power cell-edge UEs on RBs 1-20, as Cell 2 may schedule its cell-center UEs on the DL which are less sensitive to UE-to-UE interference. Meanwhile, Cell 1 may schedule its cell-center UEs on RBs 21-50, as the cell-center UEs are less sensitive to eNB-to-eNB interference even if Cell 2 schedules high-power cell-edge UEs on the DL on RBs 26 to 50. Combining the above analysis, as a result, if Cell 1, which is in a UL flexible subframe, does not know whether Cell 2 is in a UL subframe or a DL subframe, it is safe for Cell 1 to schedule its cell-edge UEs on RBs 1-20 and its cell-center UEs on RBs 21-50.

Depending on the RNTPs and HIIs of the neighboring cells, it may be possible that the cell cannot find appropriate RBs for the cell-edge UEs. In such a case, the cell may schedule the cell-edge UEs in the static DL/UL subframes and schedule only cell-center UEs in the flexible UL/DL subframes.

In some embodiments, to minimize the eNB-to-eNB interference, in the flexible DL subframes the pico cell may avoid transmitting some of the high-power common control signals, such as CRS and CSI-RS. For example, such signals may be coordinated and transmitted only in the static DL subframes. For instance, if the pico cell uses NCT, CRS may not have to be transmitted in every DL subframe.

In some embodiments, if the common control signals, such as CRS and CSI-RS, are to be transmitted in the flexible DL subframes, the pico cells may reduce their transmit power. In such cases, UEs may be configured to perform radio resource management (RRM) measurements and pathloss measurement based on the high-power CRS in the static DL subframes. A new set of downlink power control parameters $\rho_A$ (ratio of PDSCH energy per resource element (EPRE) to CRS EPRE for OFDM symbols not containing CRS), $\rho_B$ (ratio of PDSCH EPRE to CRS EPRE for OFDM symbols containing CRS), and $P_C$ (ratio of PDSCH EPRE to CSI-RS EPRE) may also be defined for the flexible DL subframes and signaled to the UE. The power reduction of the CSI-RS or CRS during the flexible DL subframes may also be signaled to the UE so that the UE can adjust the CQI estimation for the flexible DL subframes.

In some embodiments, to minimize the impact on the UE, instead of the pico cell reducing CRS/CSI-RS in the flexible DL subframes, the pico cell may also let the neighboring cells know the CRS/CSI-RS configuration, such as the number of antenna ports, so that the neighboring eNB can perform interference cancellation.

There may be cases in which some control signals may need to be transmitted at high power during the flexible subframes. Examples include the UL grant on the PDCCH or enhanced PDCCH (ePDCCH), which is used to schedule a future uplink transmission from a cell-edge UE, the DL ACK/NACK, which corresponds to the UL transmission from a cell-edge UE a few subframes earlier, and the ACK/NACK on the PUCCH from a cell-edge UE, which acknowledges the DL transmission a few subframes earlier. In some embodiments, to combat eNB-to-eNB interference, neighboring cells that are on UL subframes may use conservative MCS levels for PUSCH transmissions. In some embodiments, to combat UE-to-UE interference, neighboring cells that are on DL subframes may avoid DL transmission on the band-edge RBs that are used for the PUCCH.

In some cases, one cell may be in a DL subframe while a neighboring cell may be in a special subframe, such as Subframe 6 when Cell 1 uses a TDD configuration of 5 ms DL-to-UL switch-point periodicity and Cell 2 uses a TDD configuration of 10 ms DL-to-UL switch-point periodicity. In such cases, the cell in the DL subframe may cease transmission in the last one or two OFDM symbols so that the cell does not create interference to a neighboring cell which is in a UpPTS (Uplink Pilot Time Slot) used for the physical random access channel (PRACH) or the sounding reference signal (SRS). Alternatively, if only the SRS is configured in the UpPTS in the neighboring cell, then SRSs from cell-center UEs may be configured which are less sensitive to eNB-to-eNB interference.

With dynamic TDD configuration, the interference environment may change significantly from subframe to subframe. For example, in FIG. 11, Subframes 0, 1, 5, and 6 are static downlink subframes while Subframes 2 and 7 are static uplink subframes. The remaining Subframes 3, 4, 8, and 9 are flexible subframes which may be either DL or UL for traffic adaptation. The DL interference the UE sees during the flexible subframes may be different from that during the static DL subframes. This issue exists in both fast and slow adaptation of TDD configuration.

In an embodiment, to reflect the dynamic interference environment, CQI reporting may be enhanced. In some embodiments, the UE may report multiple CQIs for different sets of subframes, for example, per subframe CQI. Alternatively, the UE may report five CQIs in the example of FIG. 11, one CQI for the static DL subframes and one CQI for each flexible subframe. In some embodiments, to reduce the CQI feedback overhead, two CQIs may be fed back, one for the static DL subframes and one for the flexible subframes. The CQI for the flexible subframes may reflect an average of the interference levels during all of the flexible subframes. In this case, the feedback overhead reduction may be achieved at the cost of CQI accuracy.

In some embodiments, such as in the case of dynamic TDD with slow adaptation, neighboring pico cells may exchange their TDD configurations via X2. In an embodiment, an eNB may configure a reduced number of CQIs for a UE with knowledge of the TDD configurations of the neighboring cells. For example, in FIG. 11, it may be assumed that a UE is in Cell 1 and that Cell 2 and Cell 3 are neighboring cells. In such an example, the eNB may only configure three CQIs for the UE. The first CQI may correspond to the static DL subframes (Subframes 0, 1, 5, and 6). The second CQI may be for Subframes 3 and 8, as the UE sees the same interference from Cell 2 and Cell 3 in those two subframes. The third CQI may be for Subframes 4 and 9, as interference from Cell 2 and Cell 3 is the same in those two subframes.

In some embodiments, the resource-restricted CSI measurement introduced in Rel-10 for enhanced inter-cell interference coordination (eICIC) almost blank subframes (ABS) may be reused for the UE to report the two CQIs corresponding to static DL subframes and flexible subframes. The measurement resource restriction pattern for eICIC ABS is specified in the information elements (IEs) CQI-ReportConfig and MeasSubframePattern in 3GPP TS 36.331, as shown in FIG. 13. Due to the periodicity of ABS, the subframePatternTDD in the IE MeasSubframePattern is defined in terms of multiple radio frames. For the dynamic TDD scenario, it may be sufficient to specify the measurement subframe pattern by one radio frame to reduce the signaling overhead. Therefore, in an embodiment, in the IE MeasSubframePattern, an additional subframe pattern of 10 bits may be added, which is indicated by underlining in the example of FIG. 13.

If more than two CQIs are desired for dynamic TDD to reflect the interference level in an individual flexible subframe, then more measurement subframe subsets may be defined in the IE CQI-ReportConfig, an example of which is shown in FIG. 14, with the additional measurement subframe subsets indicated by underlining.

A fourth set of embodiments will now be considered. In the multi-serving cell scenario, a UE may be connected to both a macro cell and a pico cell, and the macro cell and the pico cell may be from the same or different eNBs. The macro cell and the pico cell may be on the same frequency or different frequencies. The fourth set of embodiments involves supporting inter-eNB carrier aggregation in the multi-serving cell scenario. The macro cell may be the PCell and the pico cell may be the SCell. In the case of the macro cell and the pico cell being co-channel, PCell and SCell refer to cells on the same frequency. In the current LTE CA, PCell and SCell are on different frequencies. The fourth set of embodiments may further involve having a UE feed pico cell-related L1 control signals, such as ACK/NACK/CSI/SR, back to the pico cell. The fourth set of embodiments may also involve having the pico cell signal the macro cell about dynamic TDD with fast adaptation.

Figure 15:
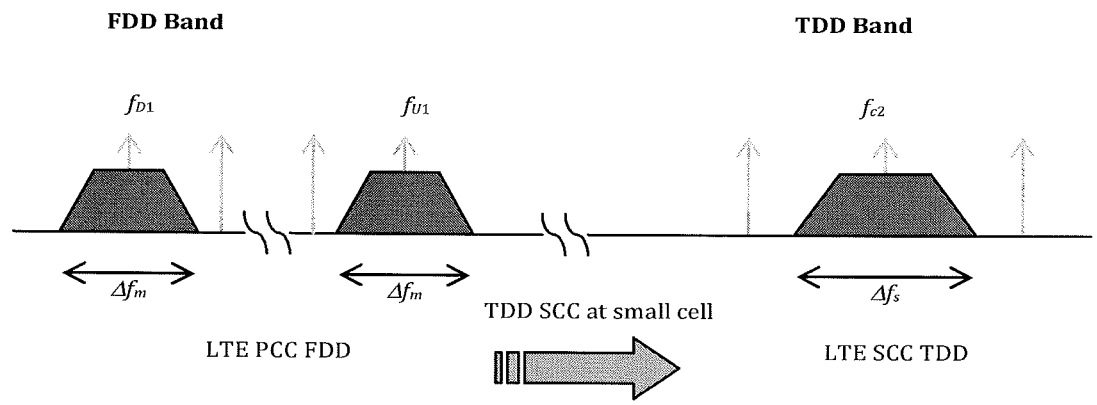
FIG. 15 is a diagram of a pico cell configured as an LTE TDD SCC, according to an embodiment of the disclosure.
Figure 16:
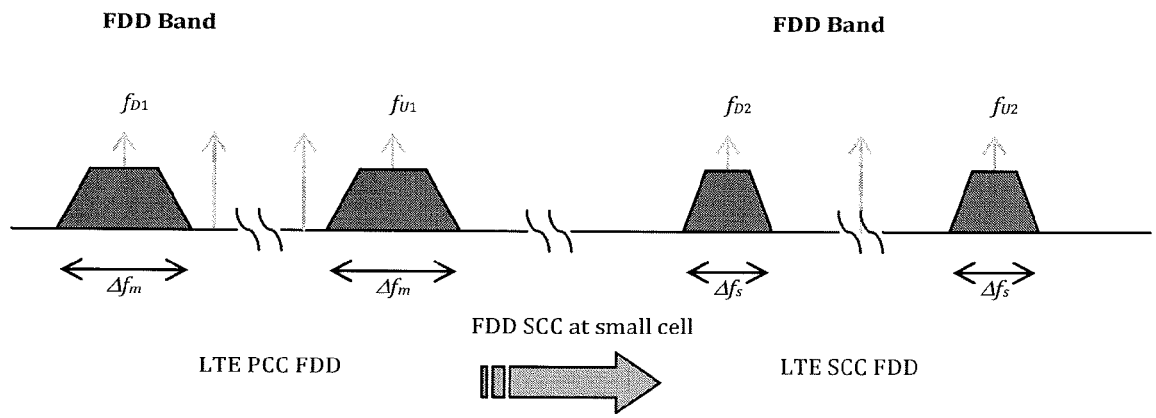
FIG. 16 is a diagram of a pico cell configured as an LTE FDD SCC, according to an embodiment of the disclosure.

In future systems, it may be envisioned that the macro layer may use FDD or TDD while the pico cell layer may use TDD or FDD. In some such cases, the macro cell may operate on a lower carrier frequency relative to the pico cell due to the propagation characteristics. For better usage of the available bandwidth and for traffic flow adaptation, TDD may be used at the pico cell. Alternatively, the pico cell may operate in FDD with a small bandwidth. For example, as depicted in the example of FIG. 15, the macro cell may operate over $\{f_{D1}, f_{U1}\} \pm \Delta f_m/2$ in FDD, and the pico cell may operate in TDD over $\{f_{c2}\} \pm \Delta f_s/2$, where $f_{D1}$, $f_{U1}$ and $\Delta f_m$ are the downlink carrier frequency, the uplink carrier frequency, and the bandwidth, respectively, used by the macro cell, and $f_{c2}$ and $\Delta f_s$ are the carrier frequency and the channel bandwidth used by the pico cell using TDD. $f_{c2}$ may preferably be higher than $f_{D1}$ and $f_{U1}$. Alternatively, as illustrated in the example of FIG. 16, the pico cell may operate in FDD over $\{f_{D2}, f_{U2}\} \pm \Delta f_s/2$ where $f_{D2}$, $f_{U2}$ and $\Delta f_s$ are the downlink carrier frequency, the uplink carrier frequency, and the channel bandwidth, respectively, used by the pico cell. The LTE FDD carrier frequencies may be selected from any of the evolved universal terrestrial radio access (E-UTRA) operating bands 1-14 or 17-28 as defined in Table 5.5-1 in 3GPP TS 36.101, whereas E-UTRA operating bands 33-44 may be selected for the pico cell's TDD operation. In some cases, the UE may have dual connectivity to the macro cell and the pico cell. In such cases, the multi-serving cell scenario may be implemented as carrier aggregation with the PCell using macro FDD and one or more SCells using pico cell TDD/FDD.

If the pico cells on a higher frequency are deployed via RRHs, then the multi-serving cell scenario may be considered an intra-eNB carrier aggregation with multiple timing advances (TAs), except that the aggregated carriers may be of different duplex modes FDD and TDD. The CA scheme currently being discussed in 3GPP Rel-11 assumes that the aggregated carriers are of the same duplex mode, either FDD or TDD. If the existing CA design is reused, the pico cell and the macro cell may operate tightly. However, if the macro cell and the pico cell are to operate more independently, at least seven new design aspects may be introduced in various embodiments. These new design aspects may also applicable to the case of the pico cell and the macro cell being deployed as independent eNBs.

First, due to the good channel conditions in the pico cell, in some embodiments, cross-carrier scheduling may be disabled, and the UL/DL grants for the data transmissions on the pico cell and the macro cell may come from the respective cells. Alternatively, the UL/DL grants of both the macro cell and the pico cell may be transmitted on the pico cell. That is, the UL/DL grants for both the PCell and the SCell may come from the SCell. In the current LTE CA, the UL/DL grants for the PCell can only come from PCell. In the pico cell environment, since PAPR and UE power may not be major concerns, the UL PUCCH control signals, such as the ACK/NACK/CSI corresponding to the pico cell, may be transmitted to the pico cell, i.e., the SCell. To enable this, a bit may be added in the RRCConnectonReconfiguration message so that when an SCell is added, the UE knows that the UL control signal corresponding to the SCell will be transmitted back to the SCell. This is illustrated in FIGS. 17a and 17b, with the disclosed modifications represented by underlining. Alternatively, the UL control signals (e.g., ACK/NACK/CSI) of both the macro cell and the pico cell may go to the pico cell to save UE power.

Figure 18:
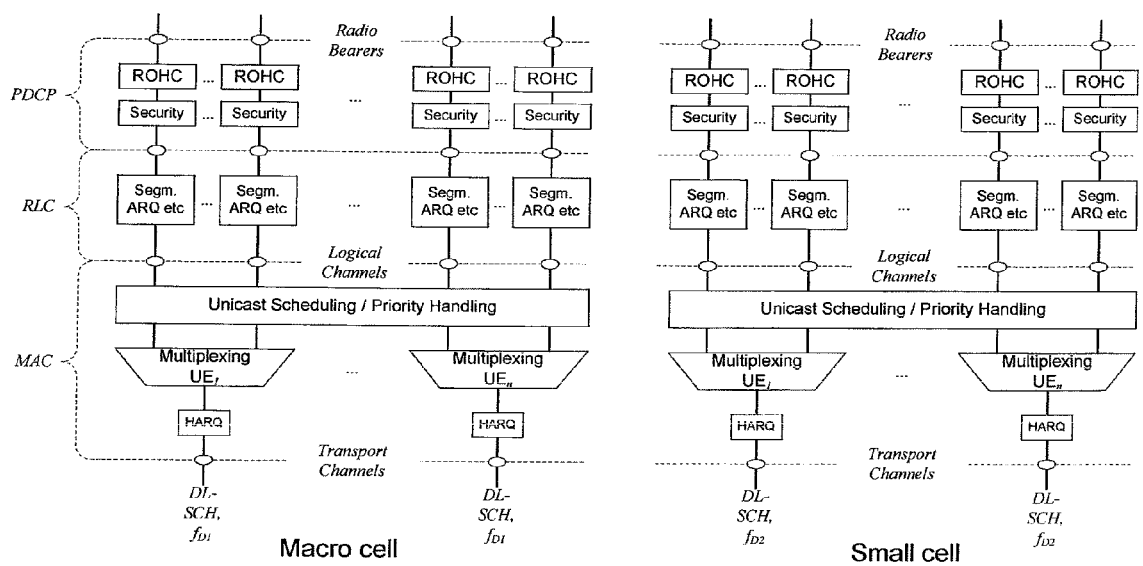
FIG. 18 is a diagram of a downlink Layer 2 protocol, according to an embodiment of the disclosure.
Figure 19:
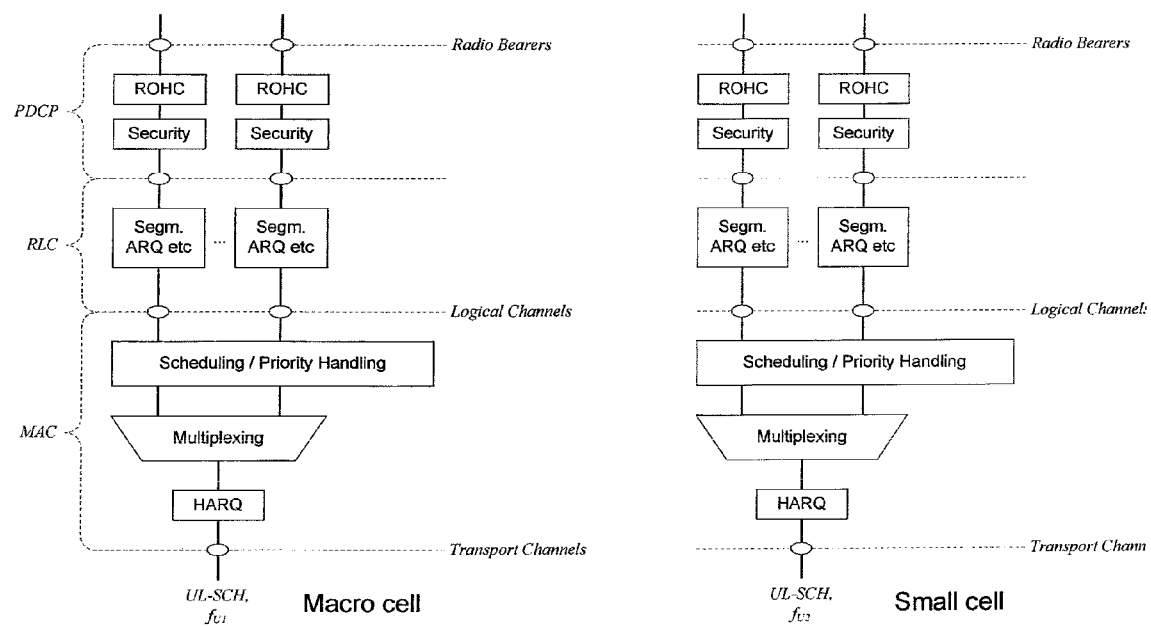
FIG. 19 is a diagram of an uplink Layer 2 protocol, according to an embodiment of the disclosure.

Second, in some embodiments, a macro PCell and a pico cell SCell may have separate schedulers, as shown in the examples of FIG. 18 and FIG. 19. Information, such as the subframes when the UE will communicate with the macro cell, may be exchanged between the macro cell and the pico cell so that the two schedulers may coordinate the data transmissions.

Third, in some embodiments, if the UE separates the traffic for a macro PCell and a pico cell SCell, the UE may report separate BSRs/SRs to reflect the buffered data corresponding to the pico cell and the macro cell. The BSRs/SRs may be sent to the corresponding macro cell and pico cell. The BSRs/SRs may also be sent together to the macro cell or to the pico cell.

Fourth, in some embodiments, such as in the case of dynamic TDD with fast adaptation on the pico cell, a bit may be added in the IE RadioResourceConfigCommonSCell so that the UE knows that dynamic TDD with fast adaptation is used in the pico cell. This is illustrated in FIG. 20, with the disclosed modifications represented by underlining. The UE knows that, for the added SCell, the UE may ignore the TDD UL/DL configuration specified in tdd-Config-r10 and, instead, use pre-configured information to assume certain subframes as static DL/UL subframes and the remaining subframes as flexible subframes. For example, if only UL/DL configurations 0, 1, 2, and 6 are allowed in an SCell (i.e., configurations of 5 ms DL-to-UL switch-point periodicity), the UE may assume that Subframes 0, 1, 5, and 6 are static DL subframes including special subframes, that Subframes 2 and 7 are static UL subframes, and that the remaining subframes are flexible subframes. The static UL/DL subframes may be pre-configured or signaled to the UE.

Fifth, in some embodiments, a UE may have different C-RNTIs in a PCell and an SCell. For example, to facilitate the macro cell in assigning a pico C-RNTI to the UE when adding one or more pico cells as SCells, each pico cell may reserve some C-RNTIs for UEs that can have dual connectivity with macro cells and pico cells. The pico cell may notify the macro cell about the reserved C-RNTIs. When the macro cell adds the pico cell as an SCell for a UE, the macro cell may pick a pico cell C-RNTI from the reserved pool and assign the pico cell C-RNTI to the UE. Alternatively, instead of the pico cell reserving C-RNTIs, the macro cell may signal the pico cell to ask for a C-RNTI whenever the macro cell desires a pico cell C-RNTI.

Sixth, in some embodiments, the pico cell may send its system information, e.g., the TDD configuration, to the macro eNB. When the macro eNB adds the pico cell as an SCell, the macro eNB may deliver the system information of the pico cell to the UE. If dynamic TDD configuration with slow adaptation is used in the pico cell, the pico cell may notify the macro cell about the actual TDD configuration. If dynamic TDD configuration with fast adaptation is used in the pico cell, the pico cell may notify the macro cell that dynamic TDD with fast adaptation is used in the pico cell. If the static UL/DL subframes are not pre-configured, the pico cell may notify the macro cell about the static UL/DL subframes.

Seventh, in some embodiments, the macro PCell uses FDD and the pico SCell uses TDD. If ACK/NACKs of both the PCell and the SCell need to be sent to the macro PCell, to support ACK/NACK of aggregated FDD and TDD, PUCCH Format 3, which can carry up to 20 bits of ACK/NACK, may be used to deliver the ACK/NACK bits from both FDD and TDD carriers. In the worst case of TDD configuration 5, in which Subframe 2 needs to feed back ACK/NACK of PDSCH transmissions in nine DL subframes, combining with the ACK/NACK of the FDD carrier, the 20 bits may be sufficient as each PDSCH transmission supports at most two codewords. In the case of the macro PCell using TDD and the pico SCell using FDD, if ACK/NACKs of both the PCell and the SCell need to be sent to the macro PCell, the ACK/NACKs on the SCell may be multiplexed or bundled over multiple subframes and/or codewords and sent on the PCell's TDD UL subframe.

If the pico cell is deployed as an independent eNB with its own backhaul, then the inter-eNB carrier aggregation may be different from the current CA, which assumes intra-eNB carrier aggregation. A difference from the above RRH case is that any communication between the macro cell and the pico cell may involve X2 messages and backhaul delay. At least five aspects related to such scenarios may be disclosed.

First, due to the large delay on X2, the macro cell and the pico cell may operate more independently than the case of a pico cell being deployed via RRH. Therefore, in some embodiments, cross-carrier scheduling may not be used. The UL control signals of the pico cell, such as the ACK/NACK/ CSI corresponding to the transmissions in the pico cell, may go to the pico cell, and a bit in the RRCConnectonReconfiguration message may be used to enable this, as shown in FIGS. 17a and 17b.

Second, in some cases, such as in the case of an independent pico cell eNB, the macro cell and the pico cell may each have their own schedulers, as shown in the examples of FIG. 18 and FIG. 19. In an embodiment, information, such as the subframes when the UE will communicate with the macro cell, may be exchanged between the macro cell and the pico cell via X2 so that the two schedulers may coordinate the data transmissions to reliably maintain the two communication links under the UE maximum power constraint. In some embodiments, the UE may report separate BSRs/SRs to reflect the buffered data on the pico cell and the macro cell.

Third, in some embodiments, such as in the case of dynamic TDD with fast adaptation in the pico cell, a bit may be added in the IE RadioResourceConfigCommonSCell to notify the UE that dynamic TDD with fast adaptation is used in the pico cell. This is shown in FIG. 20. The static UL/DL subframes may be either pre-configured or signaled to the UE.

Fourth, in some embodiments, different C-RNTIs may be used in a macro PCell and a pico cell SCell. Similarly to the RRH case, this may be achieved by, for example, the pico cell reserving some C-RNTIs for the macro cell to use. Alternatively, the macro cell may explicitly ask the pico cell for a C-RNTI via X2 when desired.

Fifth, in some embodiments, the pico cell may send its system information, e.g., the TDD configuration, to the macro eNB via X2. When the macro eNB adds the pico cell as an SCell, the eNB may deliver the system information of the pico cell to the UE. If dynamic TDD configuration with slow adaptation is used in the pico cell, the pico cell may notify the macro cell about the actual TDD configuration via X2. If dynamic TDD configuration with fast adaptation is used in the pico cell, the pico cell may notify the macro cell via X2 that dynamic TDD with fast adaptation is used in the pico cell. If the static UL/DL subframes are not pre-configured, the pico cell may notify the macro eNB about the static UL/DL subframes via X2.

In an embodiment, if simultaneous UE transmissions to the macro cell and the pico cell exceed the UE maximum power, the UE may scale down the transmit power to the pico cell first and prioritize the transmission to the macro cell. Alternatively, to avoid exceeding the UE maximum power, the network may avoid simultaneous transmission to the macro cell and the pico cell by letting the UE transmit all data to the pico cell. For example, in the case of a macro cell and a pico cell deployed as intra-eNB CA and the macro cell and the pico cell operating tightly (e.g., one scheduler for both), the network may route the macro cell data to the pico cell by scheduling the UE to send all data on the SCell.

In an example scenario, the secondary component carriers at a pico cell may be deployed as non-standalone carriers. That is, UEs may not be connected to the LTE network through the pico cell. Instead, a UE may initially connect to the LTE evolved packet core (EPC) via the macro cell and may subsequently switch to the pico cell. The aggregated system information may be broadcast by the macro cell. The pico cell may inform the macro cell of the relevant system information, such as the TDD configuration. In the event of updated system information, the pico cell or the macro cell may page the UEs connected to the pico cell, and/or the differential system information may be sent to those UEs in dedicated RRC signaling by the pico cell. To reduce the system information overhead, the SIBs containing the pico cell SI may be transmitted less frequently. In an embodiment, a new SIB message may include this information. In some embodiments, the existing schemes in CA may be used to handle the SIB changes of the pico cell. For example, the SCell may first be released and then the same SCell may be added, and this may be done with a single RRC reconfiguration message. Since the network entry operation is through the macro cell, this change may not affect the network entry time. Some of the RRC functionality of the pico cell, preferably those functions which are not delay sensitive, may be performed at the macro cell. For example, HO decision making may be done at the macro cell.

Figure 21:
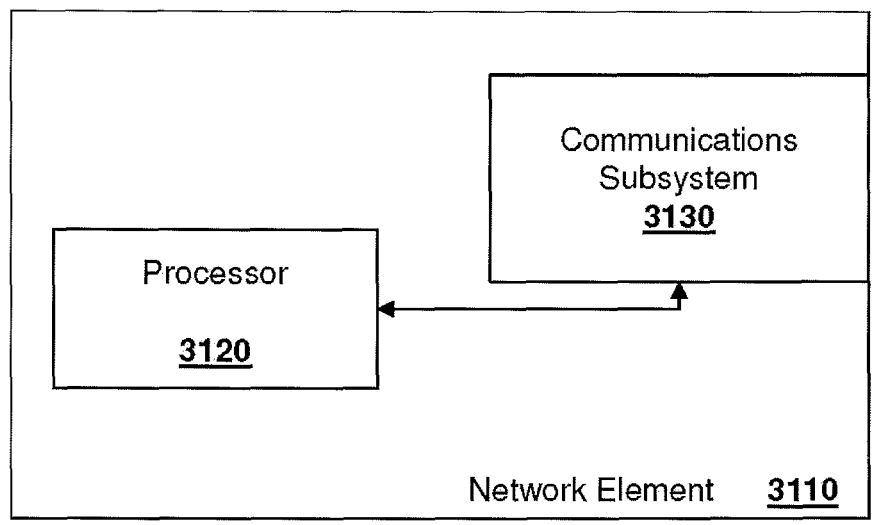
FIG. 21 is a simplified block diagram of an exemplary network element according to one embodiment.

The above may be implemented by a network element. A simplified network element is shown with regard to FIG. 21. In the figure, network element 3110 includes a processor 3120 and a communications subsystem 3130, where the processor 3120 and communications subsystem 3130 cooperate to perform the methods described above.

Figure 22:
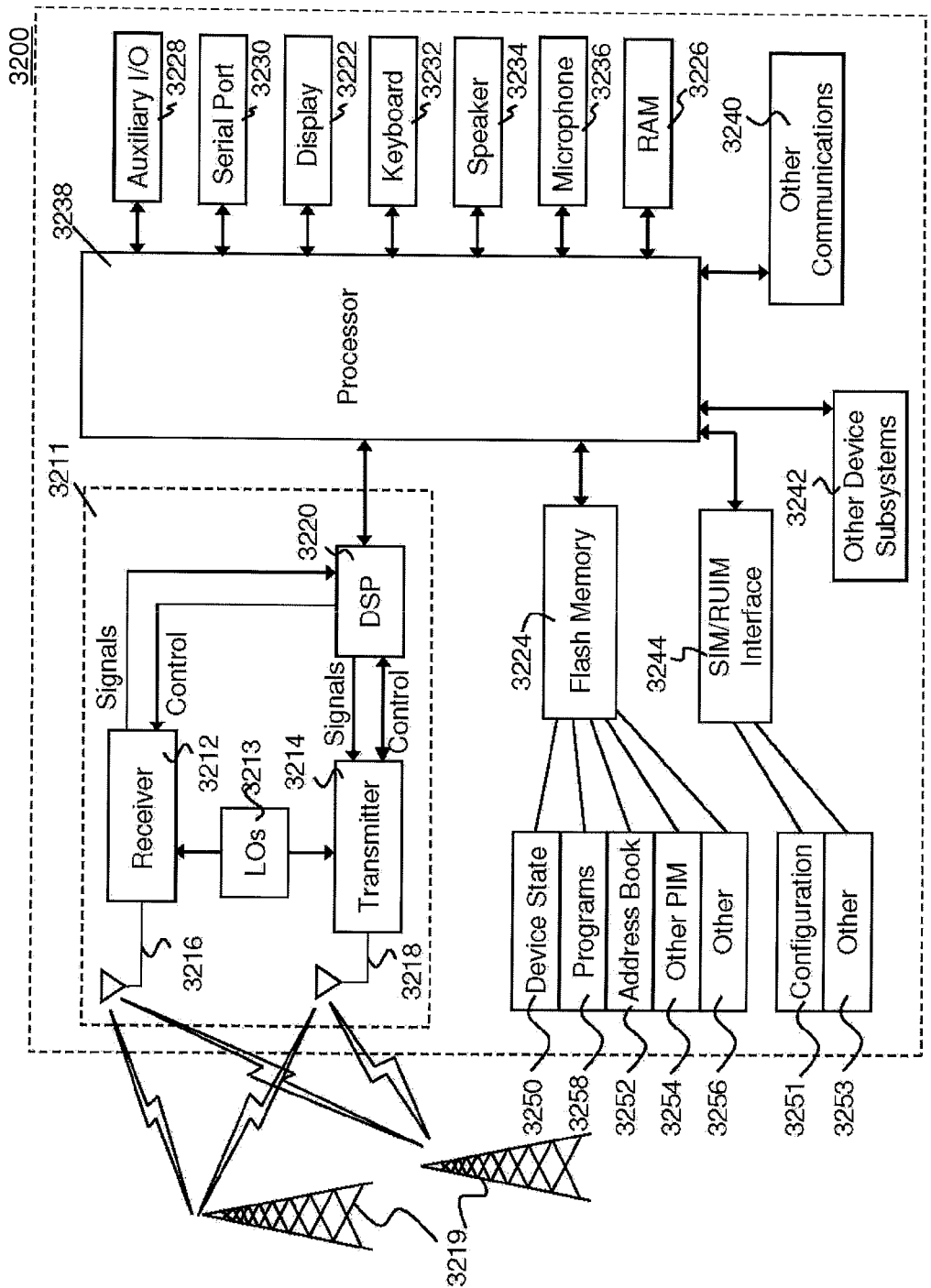
FIG. 22 is a block diagram with an example user equipment capable of being used with the systems and methods in the embodiments described herein.

Further, the above may be implemented by a UE. One exemplary device is described below with regard to FIG. 22. UE 3200 is typically a two-way wireless communication device having voice and data communication capabilities. UE 3200 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. As will be apparent to those skilled in the field of communications, the particular design of the communication subsystem 3211 will be dependent upon the communication network in which the device is intended to operate.

Network access requirements will also vary depending upon the type of network 3219. In some networks network access is associated with a subscriber or user of UE 3200. A UE may require a removable user identity module (RUIM) or a subscriber identity module (SIM) card in order to operate on a network. The SIM/RUIM interface 3244 is normally similar to a card-slot into which a SIM/RUIM card can be inserted and ejected. The SIM/RUIM card can have memory and hold many key configurations 3251, and other information 3253 such as identification, and subscriber related information.

When required network registration or activation procedures have been completed, UE 3200 may send and receive communication signals over the network 3219. As illustrated in the figure, network 3219 can consist of multiple base stations communicating with the UE.

Signals received by antenna 3216 through communication network 3219 are input to receiver 3212, which may perform such common receiver functions as signal amplification, frequency down conversion, filtering, channel selection and the like. Analog to digital (A/D) conversion of a received signal allows more complex communication functions such as demodulation and decoding to be performed in the DSP 3220. In a similar manner, signals to be transmitted are processed, including modulation and encoding for example, by DSP 3220 and input to transmitter 3214 for digital to analog (D/A) conversion, frequency up conversion, filtering, amplification and transmission over the communication network 3219 via antenna 3218. DSP 3220 not only processes communication signals, but also provides for receiver and transmitter control. For example, the gains applied to communication signals in receiver 3212 and transmitter 3214 may be adaptively controlled through automatic gain control algorithms implemented in DSP 3220.

UE 3200 generally includes a processor 3238 which controls the overall operation of the device. Communication functions, including data and voice communications, are performed through communication subsystem 3211. Processor 3238 also interacts with further device subsystems such as the display 3222, flash memory 3224, random access memory (RAM) 3226, auxiliary input/output (I/O) subsystems 3228, serial port 3230, one or more keyboards or keypads 3232, speaker 3234, microphone 3236, other communication subsystem 3240 such as a short-range communications subsystem and any other device subsystems generally designated as 3242. Serial port 3230 could include a USB port or other port known to those in the art.

Some of the subsystems shown in the figure perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions such as a calculator or task list.

Operating system software used by the processor 3238 may be stored in a persistent store such as flash memory 3224, which may instead be a read-only memory (ROM) or similar storage element (not shown). Those skilled in the art will appreciate that the operating system, specific device applications, or parts thereof, may be temporarily loaded into a volatile memory such as RAM 3226. Received communication signals may also be stored in RAM 3226.

As shown, flash memory 3224 can be segregated into different areas for both computer programs 3258 and program data storage 3250, 3252, 3254 and 3256. These different storage types indicate that each program can allocate a portion of flash memory 3224 for their own data storage requirements. Processor 3238, in addition to its operating system functions, may enable execution of software applications on the UE. A predetermined set of applications that control basic operations, including at least data and voice communication applications for example, will normally be installed on UE 3200 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores may be available on the UE to facilitate storage of PIM data items. Such PIM application may have the ability to send and receive data items, via the wireless network 3219. Further applications may also be loaded onto the UE 3200 through the network 3219, an auxiliary I/O subsystem 3228, serial port 3230, short-range communications subsystem 3240 or any other suitable subsystem 3242, and installed by a user in the RAM 3226 or a non-volatile store (not shown) for execution by the processor 3238. Such flexibility in application installation increases the functionality of the device and may provide enhanced on-device functions, communication-related functions, or both. For example, secure communication applications may enable electronic commerce functions and other such financial transactions to be performed using the UE 3200.

In a data communication mode, a received signal such as a text message or web page download will be processed by the communication subsystem 3211 and input to the processor 3238, which may further process the received signal for output to the display 3222, or alternatively to an auxiliary I/O device 3228.

A user of UE 3200 may also compose data items such as email messages for example, using the keyboard 3232, which may be a complete alphanumeric keyboard or telephone-type keypad, among others, in conjunction with the display 3222 and possibly an auxiliary I/O device 3228. Such composed items may then be transmitted over a communication network through the communication subsystem 3211.

For voice communications, overall operation of UE 3200 is similar, except that received signals may typically be output to a speaker 3234 and signals for transmission may be generated by a microphone 3236. Alternative voice or audio I/O subsystems, such as a voice message recording subsystem, may also be implemented on UE 3200. Although voice or audio signal output is preferably accomplished primarily through the speaker 3234, display 3222 may also be used to provide an indication of the identity of a calling party, the duration of a voice call, or other voice call related information for example.

Serial port 3230 may normally be implemented in a personal digital assistant (PDA)-type UE for which synchronization with a user's desktop computer (not shown) may be desirable, but is an optional device component. Such a port 3230 may enable a user to set preferences through an external device or software application and may extend the capabilities of UE 3200 by providing for information or software downloads to UE 3200 other than through a wireless communication network. The alternate download path may for example be used to load an encryption key onto the device through a direct and thus reliable and trusted connection to thereby enable secure device communication. As will be appreciated by those skilled in the art, serial port 3230 can further be used to connect the UE to a computer to act as a modem.

Other communications subsystems 3240, such as a short-range communications subsystem, is a further optional component which may provide for communication between UE 3200 and different systems or devices, which need not necessarily be similar devices. For example, the subsystem 3240 may include an infrared device and associated circuits and components or a Bluetooth™ communication module to provide for communication with similarly enabled systems and devices. Subsystem 3240 may further include non-cellular communications such as WiFi or WiMAX.

Figure 23:
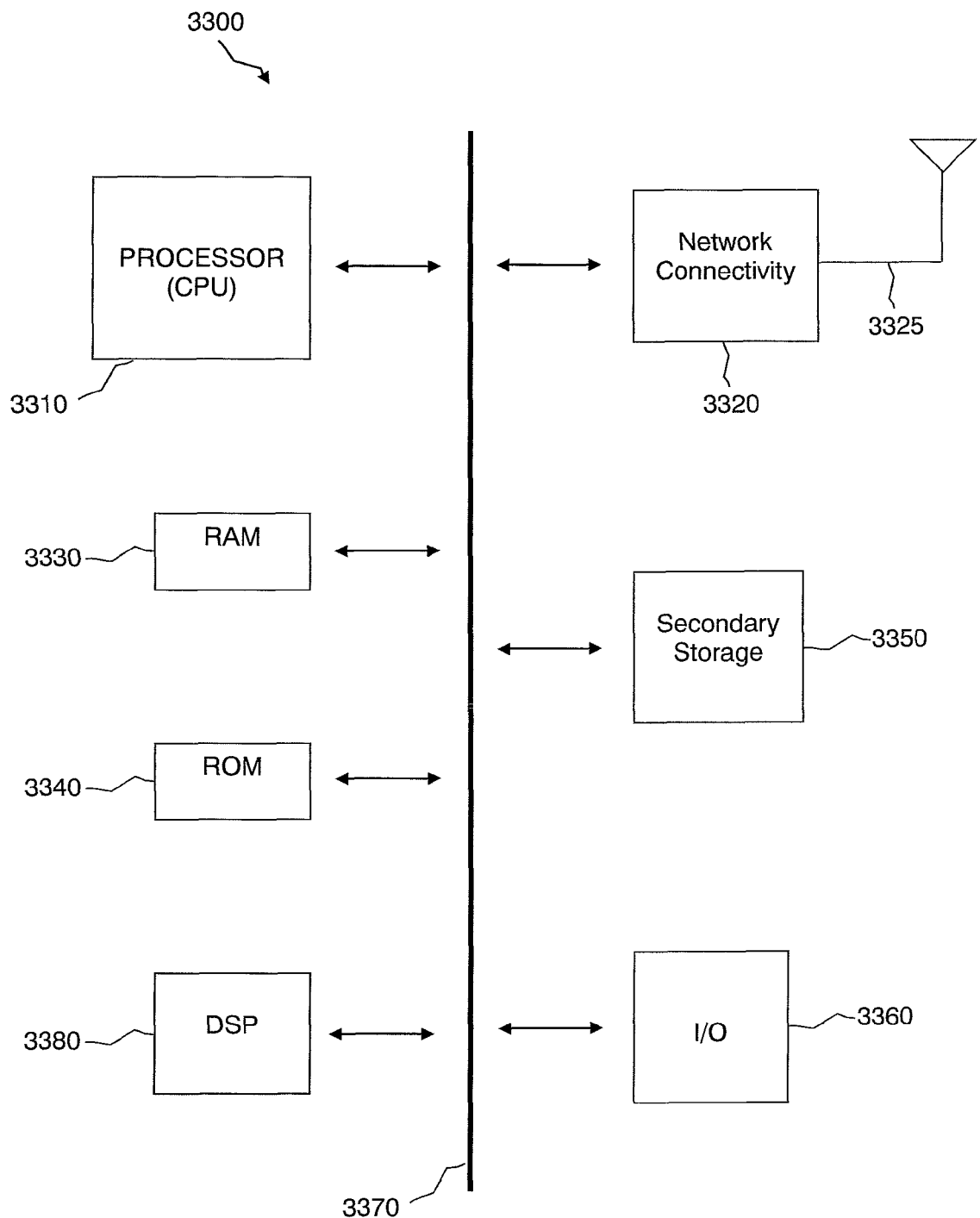
FIG. 23 illustrates a processor and related components suitable for implementing the several embodiments of the present disclosure.

The UE and other components described above might include a processing component that is capable of executing instructions related to the actions described above. FIG. 23 illustrates an example of a system 3300 that includes a processing component 3310 suitable for implementing one or more embodiments disclosed herein. In addition to the processor 3310 (which may be referred to as a central processor unit or CPU), the system 3300 might include network connectivity devices 3320, random access memory (RAM) 3330, read only memory (ROM) 3340, secondary storage 3350, and input/output (I/O) devices 3360. These components might communicate with one another via a bus 3370. In some cases, some of these components may not be present or may be combined in various combinations with one another or with other components not shown. These components might be located in a single physical entity or in more than one physical entity. Any actions described herein as being taken by the processor 3310 might be taken by the processor 3310 alone or by the processor 3310 in conjunction with one or more components shown or not shown in the drawing, such as a digital signal processor (DSP) 3380. Although the DSP 3380 is shown as a separate component, the DSP 3380 might be incorporated into the processor 3310.

The processor 3310 executes instructions, codes, computer programs, or scripts that it might access from the network connectivity devices 3320, RAM 3330, ROM 3340, or secondary storage 3350 (which might include various disk-based systems such as hard disk, floppy disk, or optical disk). While only one CPU 3310 is shown, multiple processors may be present. Thus, while instructions may be discussed as being executed by a processor, the instructions may be executed simultaneously, serially, or otherwise by one or multiple processors. The processor 3310 may be implemented as one or more CPU chips.

The network connectivity devices 3320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 3320 may enable the processor 3310 to communicate with the Internet or one or more telecommunications networks or other networks from which the processor 3310 might receive information or to which the processor 3310 might output information. The network connectivity devices 3320 might also include one or more transceiver components 3325 capable of transmitting and/or receiving data wirelessly.

The RAM 3330 might be used to store volatile data and perhaps to store instructions that are executed by the processor 3310. The ROM 3340 is a non-volatile memory device that typically has a smaller memory capacity than the memory capacity of the secondary storage 3350. ROM 3340 might be used to store instructions and perhaps data that are read during execution of the instructions. Access to both RAM 3330 and ROM 3340 is typically faster than to secondary storage 3350. The secondary storage 3350 is typically comprised of one or more disk drives or tape drives and might be used for non-volatile storage of data or as an over-flow data storage device if RAM 3330 is not large enough to hold all working data. Secondary storage 3350 may be used to store programs that are loaded into RAM 3330 when such programs are selected for execution.

The I/O devices 3360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 3325 might be considered to be a component of the I/O devices 3360 instead of or in addition to being a component of the network connectivity devices 3320.

In an embodiment, a method is provided for communication in a wireless telecommunication network. The method comprises providing, by a network element, one of an uplink grant or a downlink grant to at least one UE that the network element has determined, based on information received from a plurality of UEs, is closer to the network element than is another UE, wherein the uplink grant is scheduled such that the UE transmits to the network element only during at least one flexible subframe that is capable of dynamically switching between an uplink subframe and a downlink subframe, and wherein the downlink grant is scheduled such that the network element transmits to the UE only during at least one flexible subframe. The method further comprises transmitting, by the network element, to at least one UE that the network element has determined, based on information received from a plurality of UEs, is closer to the network element than is another UE, only during at least one flexible subframe. The method further comprises receiving, by the network element, from at least one UE that the network element has determined, based on information received from a plurality of UEs, is closer to the network element than is another UE, only during at least one flexible subframe.

In another embodiment, a network element is provided. The network element comprises a processor configured such that the network element configures a UE to transmit a plurality of CQI reports, the plurality of CQI reports comprising at least one of: one CQI report for each downlink subframe in a radio frame, one CQI report for all static downlink subframes in a radio frame and one CQI report for each flexible downlink subframe in the radio frame, wherein the flexible subframe is capable of dynamically switching between an uplink subframe and a downlink subframe, or one CQI report for all static downlink subframes in a radio frame and one CQI report that includes an average CQI for all flexible downlink subframes in the radio frame.

In another embodiment, a method is provided for communication in a wireless telecommunication network. The method comprises transmitting, by a UE, at least one of a plurality of types of CQI report, the plurality of types of CQI report comprising: one CQI report for each downlink subframe in a radio frame, one CQI report for all static downlink subframes in a radio frame and one CQI report for each flexible downlink subframe in the radio frame, wherein the flexible subframe is capable of dynamically switching between an uplink subframe and a downlink subframe, or one CQI report for all static downlink subframes in a radio frame and one CQI report that includes an average CQI for all flexible downlink subframes in the radio frame.

The following are incorporated herein by reference for all purposes: 3GPP Technical Specification (TS) 36.101, 3GPP TS 36.212, 3GPP TS 36.213, 3GPP TS 36.300, and 3GPP TS 36.331.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for communication in a wireless telecommunication network, the method comprising:
providing, by a network element, one of an uplink grant or a downlink grant to at least one user equipment (UE) that the network element has determined, based on information received from a plurality of UEs, is closer to the network element than is another UE, wherein the uplink grant is scheduled such that the UE transmits to the network element only during at least one flexible subframe that is capable of dynamically switching between an uplink subframe and a downlink subframe, and wherein the downlink grant is scheduled such that the network element transmits to the UE only during at least one flexible subframe;
transmitting, by the network element, to at least one UE that the network element has determined, based on information received from a plurality of UEs, is closer to the network element than is another UE, only during at least one flexible subframe; and
receiving, by the network element, from at least one UE that the network element has determined, based on information received from a plurality of UEs, is closer to the network element than is another UE, only during at least one flexible subframe,
wherein the network element determines flexible subframes and static subframes in a radio frame, and wherein the transmission in the flexible subframes is at lower power than transmission in static subframes in the radio frame.

2. The method of claim 1, wherein the network element sends information about the flexible subframes and static subframes to the UE.

3. The method of claim 1, wherein the configuration of whether a flexible subframe is an uplink subframe or a downlink subframe changes faster than a backhaul signaling delay.

4. The method of claim 1, wherein the network element refrains from transmitting at least one control signal in at least one flexible subframe.

5. The method of claim 1, wherein the network element transmits at least one control signal at reduced power in at least one flexible subframe, and wherein the network element signals information related to the power reduction to the UE.

6. The method of claim 1, wherein the network element sends information about the configuration of at least one control signal transmitted in at least one flexible subframe to at least one neighboring cell.

7. The method of claim 1, wherein the network element configures a UE to transmit a plurality of channel quality indicator (CQI) reports, the plurality of CQI reports comprising at least one of:
one CQI report for each downlink subframe in a radio frame;
one CQI report for all static downlink subframes in a radio frame and one CQI report for each flexible downlink subframe in the radio frame; or
one CQI report for all static downlink subframes in a radio frame and one CQI report that includes an average CQI for all flexible downlink subframes in the radio frame.

8. The method of claim 1, wherein the network element configures a UE to transmit a plurality of CQI reports, and wherein the network element determines the CQI reports that the UE is to transmit based on knowledge the network element possesses regarding a configuration of uplink and downlink subframes in at least one neighboring cell.

9. The method of claim 1, wherein a measurement resource restriction pattern specified in the MeasSubframePattern information element in Third Generation Partnership Project (3GPP) Technical Specification (TS) 36.331 is modified for the reporting of a CQI by an addition of a subframe pattern.

10. The method of claim 1, wherein a capability for transmission of a plurality of CQI reports is provided by a definition of additional measurement subframe subsets in the CQI-ReportConfig information element in 3GPP TS 36.331.

11. The method of claim 1, wherein, on the downlink, the network element assigns a first portion of resource blocks (RBs) with relative narrowband transmit power (RNTP)=1 for high-power transmission to the other UE and assigns a second portion of RBs with RNTP=0 for low-power transmission to the UE, and wherein on the uplink, the network element assigns a third portion of RBs with high interference indicator (HII)=1 for transmissions from the other UE and assigns a fourth portion of RBs with HII=0 for transmissions from the UE, and wherein a network element in another cell schedules its cell-edge UE UL transmissions on a fifth portion of RBs that is a subset of an intersection of the second portion of RBs and the fourth portion of RBs.

12. The method of claim 1, wherein the flexible subframe is configured such that the UE that is closer to the network element than is another UE, transmits uplink data and receives downlink data in the flexible subframe.

13. A network element comprising:
a processor configured such that the network element configures a user equipment (UE) to transmit a plurality of channel quality indicator (CQI) reports, the plurality of CQI reports comprising at least one of:
one CQI report for all static downlink subframes in a radio frame and one CQI report for each flexible downlink subframe in the radio frame, wherein the flexible subframe is configured to dynamically switch between an uplink subframe and a downlink subframe, or
one CQI report for all static downlink subframes in a radio frame and one CQI report that includes an average CQI for all flexible downlink subframes in the radio frame,
wherein the network element determines flexible subframes and static subframes in a radio frame and wherein the transmission in the flexible subframes is at lower power than transmission in static subframes in the radio frame.

14. The network element of claim 13, wherein the network element determines the CQI reports that the UE is to transmit based on knowledge the network element possesses regarding a configuration of uplink and downlink subframes in at least one neighboring cell.

15. The network element of claim 13, wherein a measurement resource restriction pattern specified in the MeasSubframePattern information element in Third Generation Partnership Project (3GPP) Technical Specification (TS) 36.331 is modified for the reporting of a CQI by an addition of a subframe pattern.

16. The network element of claim 13, wherein a capability for transmission of a plurality of CQI reports is provided by a definition of additional measurement subframe subsets in the CQI-ReportConfig information element in 3GPP TS 36.331.

17. The network element of claim 13, wherein the network element determines flexible subframes and static subframes in a radio frame.

18. The network element of claim 13, wherein the network element sends information about the flexible subframes and static subframes to the UE.

19. The network element of claim 13, wherein the configuration of whether a flexible subframe is an uplink subframe or a downlink subframe changes faster than a backhaul signaling delay.

20. The network element of claim 13, wherein the network element refrains from transmitting at least one control signal in at least one flexible subframe.

21. The network element of claim 13, wherein the network element transmits at least one control signal at reduced power in at least one flexible subframe, and wherein the network element signals information related to the power reduction to the UE.

22. The network element of claim 13, wherein the network element sends information about the configuration of at least one control signal transmitted in at least one flexible subframe to at least one neighboring cell.

23. The network element of claim 13, wherein the flexible subframe is configured such that the UE transmits uplink data and receives downlink data in the flexible subframe.

24. A method for communication in a wireless telecommunication network, the method comprising:
transmitting, by a user equipment (UE), at least one of a plurality of types of channel quality indicator (CQI) report, the plurality of types of CQI report comprising:
one CQI report for all static downlink subframes in a radio frame and one CQI report for each flexible downlink subframe in the radio frame, wherein the flexible subframe is configured to dynamically switch between an uplink subframe and a downlink subframe, or
one CQI report for all static downlink subframes in a radio frame and one CQI report that includes an average CQI for all flexible downlink subframes in the radio frame,
wherein the transmission in the flexible subframes is at lower power than transmission in static subframes in the radio frame.

25. The method of claim 24, wherein the flexible subframe is configured such that the UE transmits uplink data and receives downlink data in the flexible subframe.

* * * * *